United States Patent
Van der Auwera et al.

(10) Patent No.: US 12,518,428 B2
(45) Date of Patent: Jan. 6, 2026

(54) INTER PREDICTION CODING WITH RADIUS INTERPOLATION FOR PREDICTIVE GEOMETRY-BASED POINT CLOUD COMPRESSION

(71) Applicant: QUALCOMM Incorporated, San Diego, CA (US)

(72) Inventors: Geert Van der Auwera, San Diego, CA (US); Adarsh Krishnan Ramasubramonian, Irvine, CA (US); Luong Pham Van, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 498 days.

(21) Appl. No.: 17/933,920

(22) Filed: Sep. 21, 2022

(65) Prior Publication Data

US 2023/0105931 A1    Apr. 6, 2023

Related U.S. Application Data

(60) Provisional application No. 63/254,472, filed on Oct. 11, 2021, provisional application No. 63/252,093, filed on Oct. 4, 2021.

(51) Int. Cl.
  *G06T 9/00*   (2006.01)
  *G06T 3/4007* (2024.01)
  *G06T 9/40*   (2006.01)

(52) U.S. Cl.
  CPC ............ *G06T 9/001* (2013.01); *G06T 3/4007* (2013.01); *G06T 9/40* (2013.01)

(58) Field of Classification Search
  CPC ......... G06T 9/001; G06T 3/4007; G06T 9/40; G06T 9/004; H04N 19/503; H04N 19/597
  See application file for complete search history.

(56) References Cited

U.S. PATENT DOCUMENTS

2022/0078436 A1\* 3/2022 Kim ................. H04N 19/189
2022/0180567 A1\* 6/2022 Gao ................. H04N 19/96
(Continued)

FOREIGN PATENT DOCUMENTS

WO    2022147100    7/2022

OTHER PUBLICATIONS

"Keng, Inter Prediction for Improved Quantization of Azimuthal Angle in Predictive Geometry Coding, Jul. 2021, ISO/IEC, m57351" (Year: 2021).\*

(Continued)

*Primary Examiner* — Oneal R Mistry
*Assistant Examiner* — Justin Philip Cascais
(74) *Attorney, Agent, or Firm* — Shumaker & Sieffert, PA

(57) ABSTRACT

Example devices and techniques for coding point cloud data are described. An example device includes memory configured to store the point cloud data and one or more processors communicatively coupled to the memory. The one or more processors are configured to determine least two reference points in a reference point cloud frame of the point cloud data. The one or more processors are configured to apply radius interpolation to the at least two reference points to obtain at least one radius inter predictor for at least one current point in a current point cloud frame of the point cloud data. The one or more processors are configured to code the current point cloud frame based on the at least one radius inter predictor for the at least one current point in the current point cloud frame.

41 Claims, 14 Drawing Sheets

(56) References Cited

U.S. PATENT DOCUMENTS

| | | | | |
|---|---|---|---|---|
| 2022/0358686 A1* | 11/2022 | Lasserre | ............... | H04N 19/96 |
| 2023/0164353 A1* | 5/2023 | Lee | .................... | H04N 19/105 |
| | | | | 375/240.26 |
| 2023/0362360 A1* | 11/2023 | Lee | .................... | H04N 19/593 |
| 2024/0062428 A1* | 2/2024 | Oh | ...................... | H04N 19/597 |
| 2024/0179346 A1* | 5/2024 | Hur | ....................... | G06T 9/001 |

OTHER PUBLICATIONS

International Search Report and Written Opinion—PCT/US2022/076847—ISA/EPO—Dec. 12, 2022 13 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Loi (Panasonic) K.L., et al., "[G-PCC] [New] Inter Prediction for Improved Quantization of Azimuthal Angle in Predictive Geometry Coding", 135. MPEG Meeting, Jul. 12, 2021-Jul. 16, 2021, Online, (Motion Picture Expert Group or ISO/IEC JTC1/SC29/WG11), No. m57351, Jul. 9, 2021 (Jul. 9, 2021), 7 Pages, XP030296918, Section 4.1.

MPEG 3D, et al., "Convenor's Report of the 4th WG 7 Meeting", 135. MPEG Meeting, Jul. 12, 2021-Jul. 16, 2021, Online, (Motion Picture Expert Group or ISO/IEC JTC1/SC29/WG11), No. n20499, Jul. 20, 2021 (Jul. 20, 2021), 51 Pages. XP030296283, p. 25.

Ramasubramonian A.K., et al., "[G-PCC][New proposal] Results on Inter Prediction for Predictive Geometry Coding", International Organisation for Standardisation Organisation Internationale De Normalisation ISO/IEC JTC 1/SC 29/WG 7 Coding of 3D Graphics, ISO/IEC JTC 1/SC 29/WG 7 m59650-v2, Online—Apr. 2022, pp. 1-8.

Ramasubramonian (QUALCOMM) A.K. et al., "[G-PCC] [New Proposal] Improved Inter Prediction Coding for Predictive Geometry Coding", 136. MPEG Meeting, Oct. 11, 2021-Oct. 15, 2021, Online, (Motion Picture Expert Group or ISO/IEC JTC1/SC29/WG11), No. m58195, Oct. 4, 2021 (Oct. 4, 2021), 2 Pages, XP030298954, the whole document.

* cited by examiner

⊖ Root vertex

◯ Branch vertex with 1 child

⊕ Branch vertex with 2 children

◐ Branch vertex with 3 children

⊕ Leaf vertex

INTER PREDICTION CODING WITH RADIUS INTERPOLATION FOR PREDICTIVE GEOMETRY-BASED POINT CLOUD COMPRESSION

This application claims priority to U.S. Provisional Application No. 63/252,093, filed Oct. 4, 2021, and U.S. Provisional Application No. 63/254,472, filed Oct. 11, 2021, the entire content of both of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for inter-prediction for point cloud compression. In particular, this disclosure describes techniques for inter-prediction for predictive geometry coding using radius interpolation.

In some examples, inter prediction for predictive geometry coding includes searching inter prediction points in a reference frame. However, these points are not localized on a regular 2D array sampling grid. Interpolation for inter prediction for predictive geometry coding may be complicated due to the varying spacings between samples. The techniques of this disclosure may reduce the complexity of inter prediction for predictive geometry coding using radius interpolation.

In one example, this disclosure describes a method of coding point cloud data, the method comprising: determining at least two reference points in a reference point cloud frame of the point cloud data; applying radius interpolation to the at least two reference points to obtain at least one radius inter predictor for at least one current point in a current point cloud frame of the point cloud data; and coding the current point cloud frame based on the at least one radius inter predictor for the at least one current point in the current point cloud frame.

In another example, this disclosure describes a device for coding point cloud data, the device comprising: memory configured to store the point cloud data; and one or more processors communicatively coupled to the memory, the one or more processors being configured to: determine at least two reference points in a reference point cloud frame of the point cloud data; apply radius interpolation to the at least two reference points to obtain at least one radius inter predictor for at least one current point in a current point cloud frame of the point cloud data; and code the current point cloud frame based on the at least one radius inter predictor for the at least one current point in the current point cloud frame.

In another example, this disclosure describes a device for coding point cloud data, the device comprising means for determining at least two reference points in a reference point cloud frame of the point cloud data; means for applying radius interpolation to the at least two reference points to obtain at least one radius inter predictor for at least one current point in a current point cloud frame of the point cloud data; and means for coding the current point cloud frame based on the at least one radius inter predictor for the at least one current point in the current point cloud frame.

In another example, this disclosure describes a non-transitory computer-readable storage medium storing instructions, which, when executed, cause one or more processors to: determine at least two reference points in a reference point cloud frame of the point cloud data; apply radius interpolation to the at least two reference points to obtain at least one radius inter predictor for at least one current point in a current point cloud frame of the point cloud data; and code the current point cloud frame based on the at least one radius inter predictor for the at least one current point in the current point cloud frame.

The details of one or more examples are set forth in the accompanying drawings and the description below. Other features, objects, and advantages will be apparent from the description, drawings, and claims.

DETAILED DESCRIPTION

Inter prediction for predictive geometry coding relies on searching inter prediction points in the reference frame. Contrary to two-dimensional (2D) video coding, these points are not localized on a regular 2D array sampling grid. In addition, in 2D video coding the 2D array sampling grid allows for relatively simple interpolation filters to be applied on a block basis to obtain subpixel accurate prediction blocks (e.g., half, one-quarter, one-eighth subpixel, etc.), which offers considerable coding efficiency for inter coding. However, interpolation on an irregular sampling grid (e.g., a three-dimensional point cloud) may be complicated due to the varying spacings between samples. The techniques of this disclosure may reduce the complexity of inter prediction for predictive geometry coding by using radius interpolation. By reducing the complexity of inter prediction, the techniques of this disclosure may improve coding accuracy and efficiency and reduce the power necessary to code a geometric point cloud.

Figure 1:
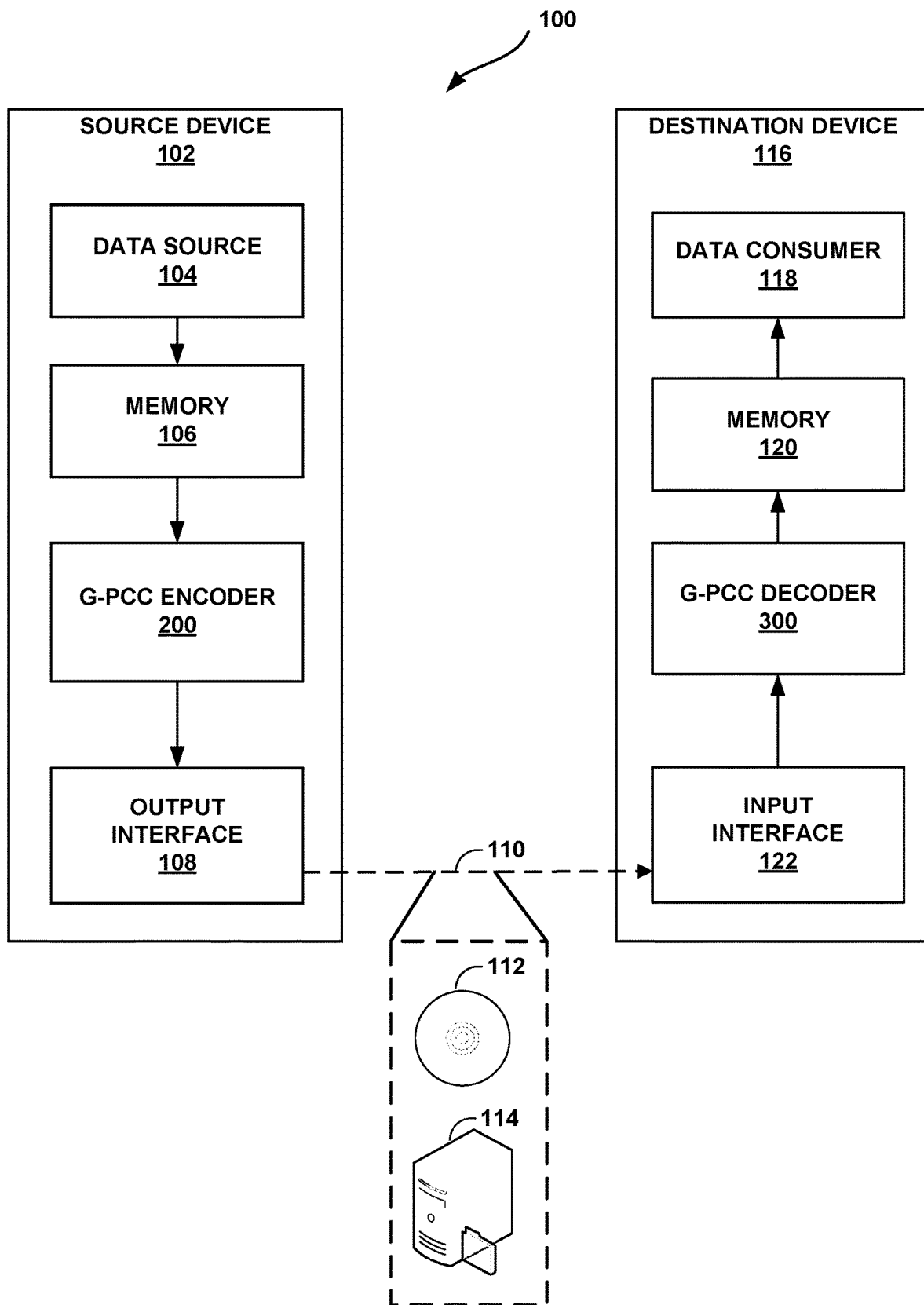
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter-predict in predictive geometry coding using radius interpolation. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to inter-predict in predictive geometry coding using radius interpolation. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively, or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally, or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices. G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11), and more recently ISO/IEC MPEG 3DG (JTC 1/SC29/WG 7), are studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in ISO/IEC FDIS 23090-9 Geometry-based Point Cloud Compression, ISO/IEC JTC 1/SC29/WG 7 m55637, Teleconference, October 2020. and a description of the codec is available in G-PCC Codec Description, ISO/IEC JTC 1/SC29/WG 7 MDS20626, Teleconference, July 2021 (hereinafter "G-PCC Codec Description").

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
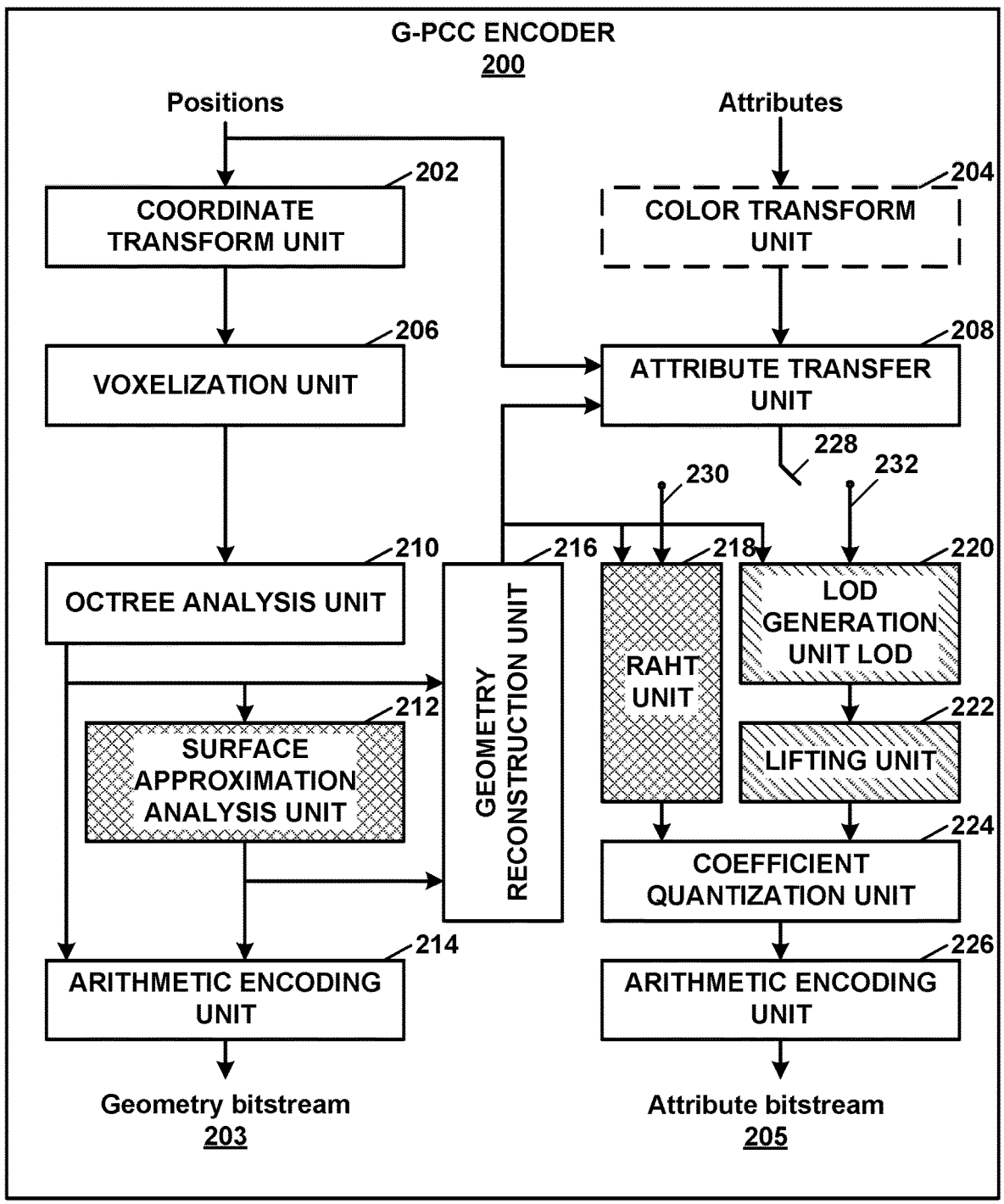
FIG. 2 is a block diagram illustrating an example Geometry Point Cloud Compression (G-PCC) encoder, one or more techniques of this disclosure.
Figure 3:
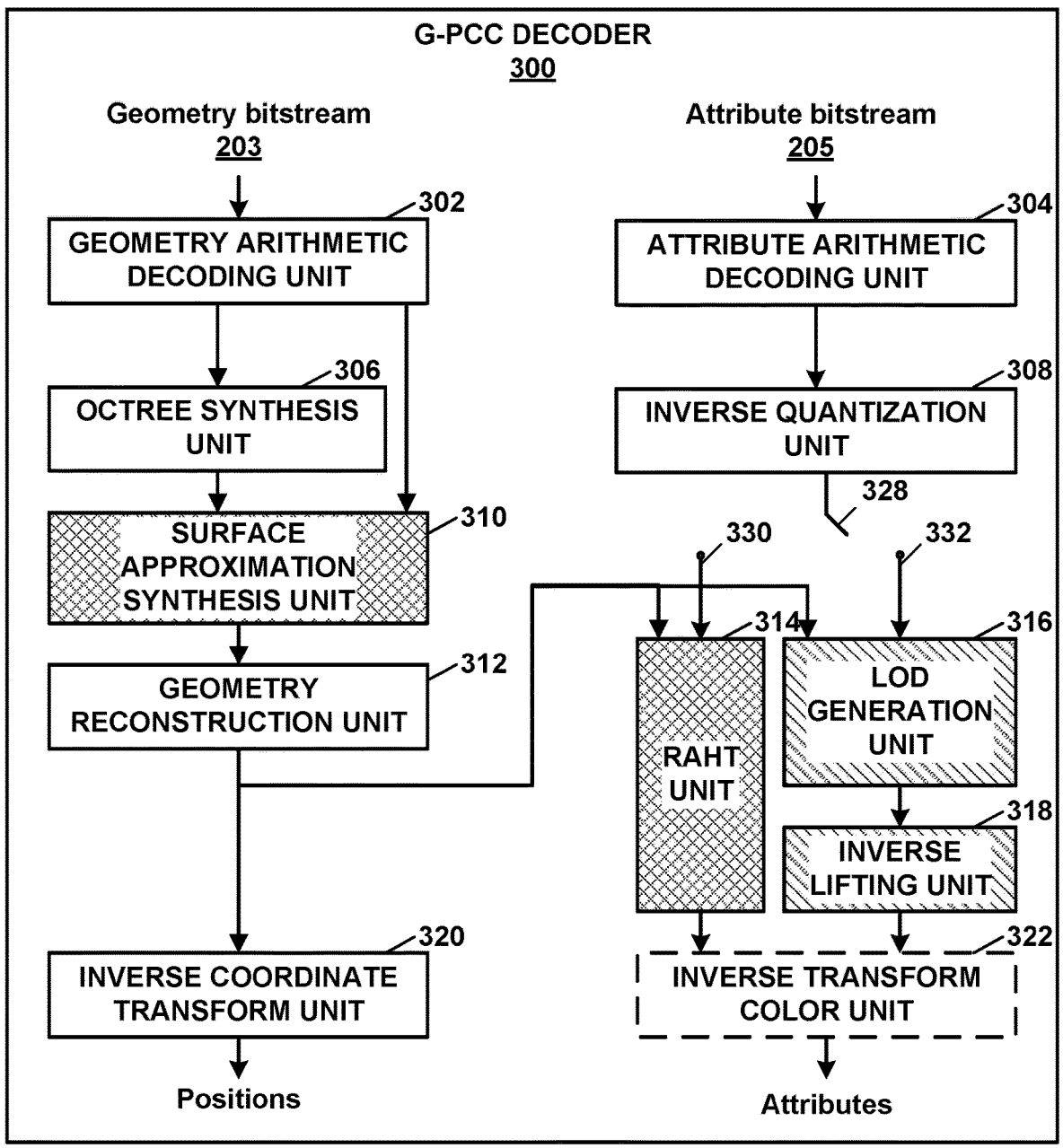
FIG. 3 is a block diagram illustrating an example G-PCC decoder, in accordance with one or more techniques of this disclosure.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the cross-hatched modules are options typically used for Category 1 data. Diagonal-crosshatched modules are options typically used for Category 3 data. All the other modules are common between Categories 1 and 3. See, e.g., ISO/IEC FDIS 23090-9 Geometry-based Point Cloud Compression, ISO/IEC JTC 1/SC29/WG 7 m55637, Teleconference, October 2020.

For geometry point clouds, two different types of coding techniques exist: Octree and predictive-tree coding. Octree coding is now discussed. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

Figure 4:
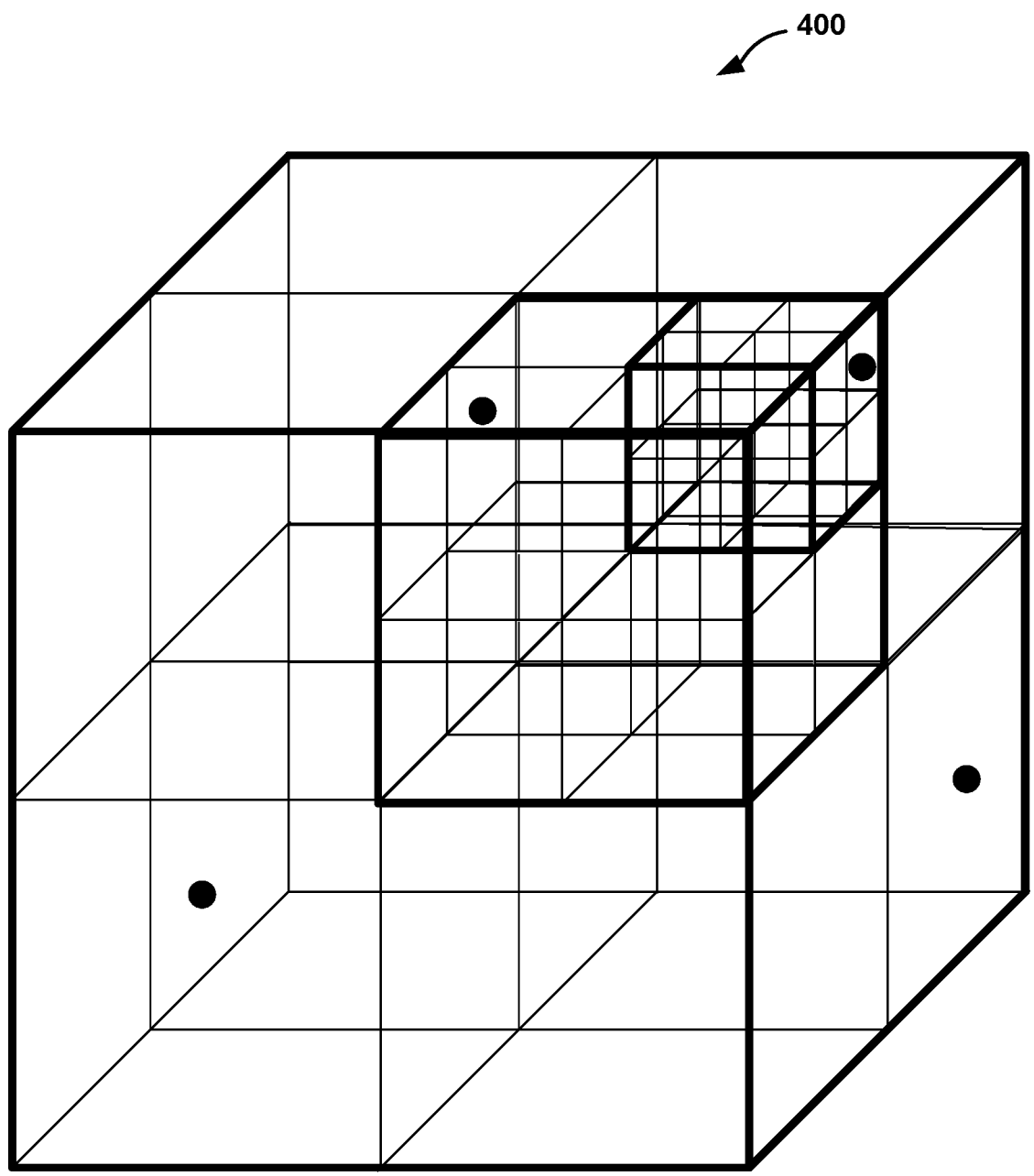
FIG. 4 is a conceptual diagram illustrating an example octree split for geometry coding, in accordance with one or more techniques of this disclosure.

FIG. 4 is an example Octree split for geometry coding according to the techniques of this disclosure. At each node of octree 400, G-PCC encoder 200 may signal an occupancy to G-PCC decoder 300 (when the occupancy is not inferred by G-PCC decoder 300) for one or more of a node's child nodes (e.g., up to eight nodes). Multiple neighborhoods are specified including (a) nodes that share a face with a current octree node, (b) nodes that share a face, edge or a vertex with the current octree node, etc. Within each neighborhood, the occupancy of a node and/or the node's children may be used to predict the occupancy of the current node or the node's children. For points that are sparsely populated in certain nodes of the octree, the codec also supports a direct coding mode where the 3D position of the point is encoded directly. G-PCC encoder 200 may signal a flag to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Switch 228 may communicatively couple attribute transfer unit 208 to RAHT unit 218 via terminal 230, in which case RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively, or additionally, switch 228 may communicatively couple attribute transfer unit 208 to LOD generation unit 220 via terminal 232 in which case lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, switch 328 may communicatively couple inverse quantization unit 308 to RAHT unit 314 via terminal 330 or to LOD generation unit 316 via terminal 332. In the case that switch 328 communicatively couples inverse quantization unit 308 to RAHT unit 314, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients.

The weight derivation process for the points is similar to the process used at G-PCC encoder 200. Alternatively, in the case that switch 328 communicatively couples inverse quantization unit 308 to LOD generation unit 316, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 5:
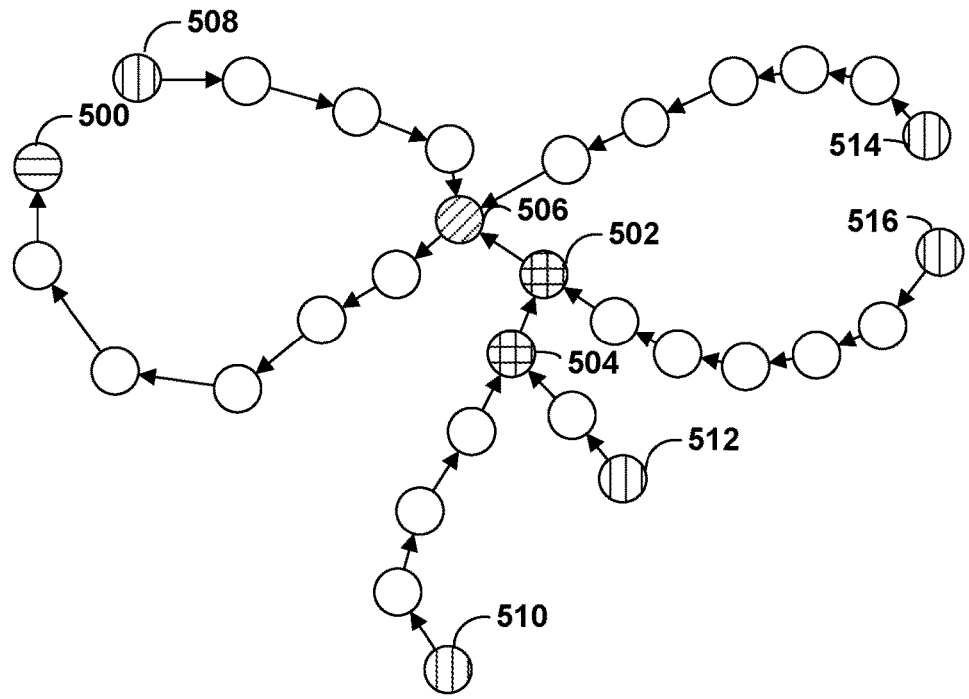
FIG. 5 is a conceptual diagram illustrating an example of a prediction tree, in accordance with one or more techniques of this disclosure.

Predictive geometry coding (see, e.g., G-PCC Codec Description) was introduced as an alternative to the octree geometry coding, where the nodes are arranged in a tree structure (which defines the prediction structure), and various prediction strategies are used to predict the coordinates of each node in the tree with respect to its predictors. FIG. 5 shows an example of a prediction tree, a directed graph where the arrow point to the prediction direction. The horizontal-hashed node is the root vertex and has no predictors; the crosshatched nodes have two children; the diagonal-hashed node has 3 children; the non-hashed nodes have one child and the vertical-hashed nodes are leaf nodes and these have no children. Every node, aside from the root node, has only one parent node.

FIG. 5 is a conceptual diagram illustrating an example of a prediction tree. Node 500 is the root vertex and has no predictors. Nodes 502 and 504 have two children. Node 506 has 3 children. Nodes 508, 510, 512, 514, and 516 are leaf nodes and these have no children. The remaining nodes each have one child. Every node aside from root node 500 has only one parent node.

Four prediction strategies are specified for each node based on its parent (p0), grand-parent (p1) and great-grand-parent (p2):
No prediction/zero prediction (0)
Delta prediction (p0)
Linear prediction (2*p0−p1)
Parallelogram prediction (2*p0+p1−p2)

G-PCC encoder 200 may employ any algorithm to generate the prediction tree; the algorithm used may be determined based on the application/use case and several strategies may be used. Some strategies are described in the G-PCC Codec Description.

For each node, the residual coordinate values are coded in the bitstream starting from the root node in a depth-first manner. For example, G-PCC encoder 200 may code the residual coordinate values in the bitstream.

Predictive geometry coding is useful mainly for Category 3 (LIDAR-acquired) point cloud data, e.g., for low-latency applications.

Figure 6A:
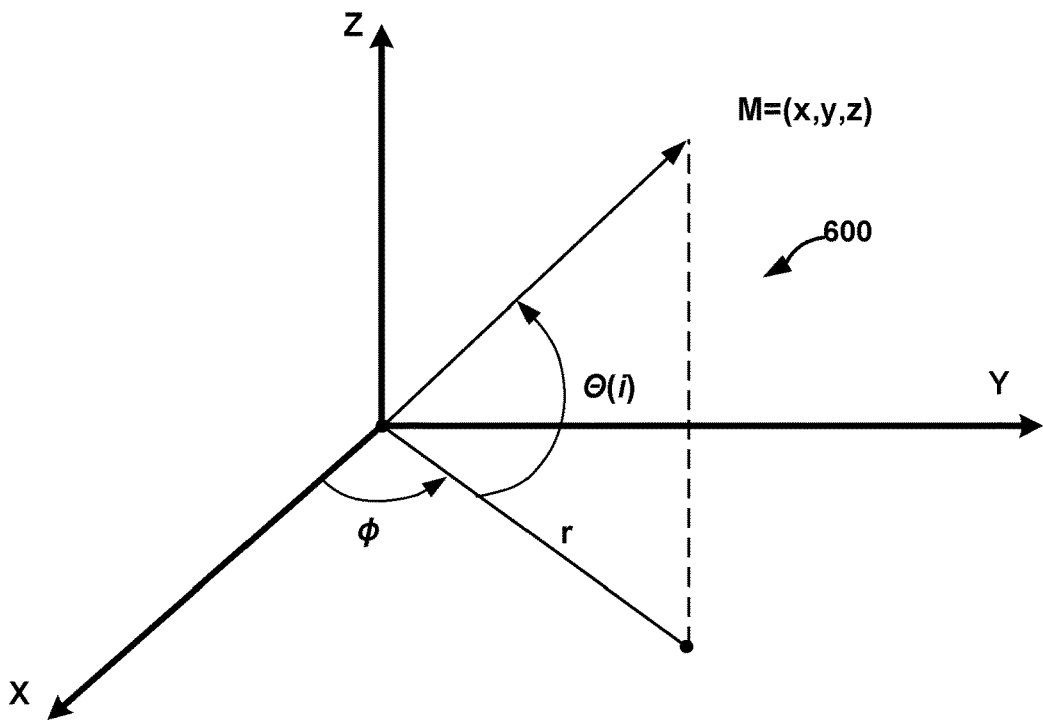
FIGS. 6A and 6B are conceptual diagrams illustrating an example of a spinning Light Detection and Ranging (LIDAR) acquisition model, in accordance with one or more techniques of this disclosure.
Figure 6B:
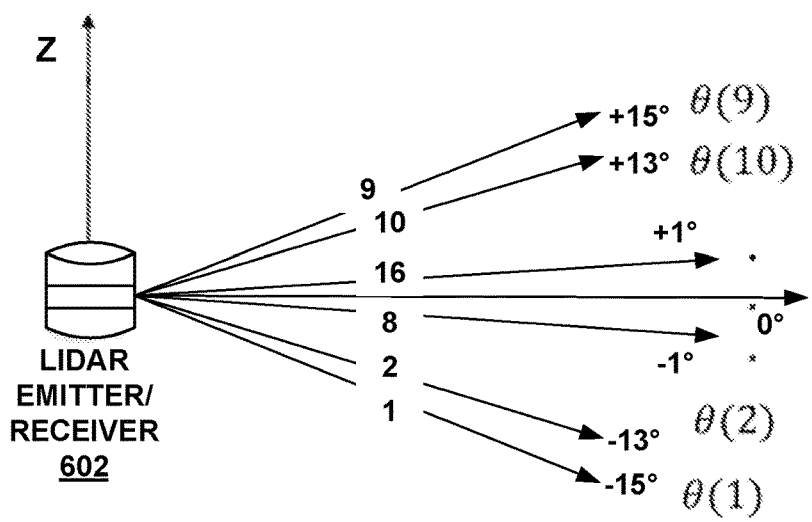

FIGS. 6A and 6B are conceptual diagrams illustrating an example of a spinning LIDAR acquisition model. Angular mode for predictive geometry coding is now described. Angular mode may be used in predictive geometry coding, where the characteristics of LIDAR sensors may be utilized in coding the prediction tree more efficiently. The coordinates of the positions are converted to the (r, ϕ, i) (radius, azimuth and laser index) domain 600 and a prediction is performed in this domain 600 (e.g., the residuals are coded in r, ϕ, i domain). Due to the errors in rounding, coding in r, ϕ, i is not lossless and hence a second set of residuals may be coded which correspond to the Cartesian coordinates. A description of the encoding and decoding strategies used for angular mode for predictive geometry coding is reproduced below from the G-PCC Codec Description.

The angular mode technique may focus on point clouds acquired using a spinning LIDAR model. Here, LIDAR 602 has N lasers (e.g., N=16, 32, 64) spinning around the Z axis according to an azimuth angle ϕ. Each laser may have different elevation $\theta(i)_{i=1 \ldots N}$ and height $\varsigma(i)_{i=1 \ldots N}$. For example, the laser i may hit a point M, with cartesian integer coordinates (x, y, z), defined according to the coordinate system shown in FIGS. 6A-6B.

This technique models the position of M with three parameters (r, ϕ, i), which are computed as follows:

$$r = \sqrt{x^2 + y^2}$$
$$\phi = a\tan2(y, x)$$
$$i = \arg\min_{j=1 \ldots N} \{z + \varsigma(j) - r \times \tan(\theta(j))\},$$

More precisely, the technique uses the quantized version of (r, ϕ, i), denoted (r̃, ϕ̃, i), where the three integers r̃, ϕ̃ and i are computed as follows:

$$\tilde{r} = \text{floor}\left(\frac{\sqrt{x^2 + y^2}}{q_r} + o_r\right) = hypot(x, y)$$

$$\tilde{\phi} = \text{sign}\,(a\tan2(y, x)) \times \text{floor}\left(\frac{|a\tan2(y, x)|}{q_\phi} + o_\phi\right)$$

$$i = \arg\min_{j=1 \ldots N} \{z + \varsigma(j) - r \times \tan(\theta(j))\}$$

where $(q_r, o_r)$ and $(q_\phi, o_\phi)$ are quantization parameters controlling the precision of ϕ and r̃, respectively. sign(t) is a function that returns 1 if t is positive and (−1) otherwise. |t| is the absolute value of t.

To avoid reconstruction mismatches due to the use of floating-point operations, the values of $\varsigma(i)_{i=1 \ldots N}$ and $\tan(\theta(i))_{i=1 \ldots N}$ are pre-computed and quantized as follows:

$$\tilde{z}(i) = \text{sign}\,(\varsigma(i)) \times \text{floor}\left(\frac{|\varsigma(i)|}{q_\varsigma} + o_\varsigma\right)$$

$$\tilde{t}(i) = \text{sign}\,(\varsigma(\tan(\theta(j))) \times \text{floor}\left(\frac{|\tan(\theta(j))|}{q_\theta} + o_\theta\right)$$

where $(q_\varsigma, o_\varsigma)$ and $(q_\theta, o_\theta)$ are quantization parameters controlling the precision of ς and θ, respectively.

The reconstructed cartesian coordinates are obtained as follows:

$$\hat{x} = \text{round}(\tilde{r} \times q_r \times \text{app\_cos}(\tilde{\phi} \times q_\phi))$$
$$\hat{y} = \text{round}(\tilde{r} \times q_r \times \text{app\_sin}(\tilde{\phi} \times q_\phi))$$
$$\hat{z} = \text{round}(\tilde{r} \times q_r \times \tilde{t}(i) \times q_\theta - \tilde{z}(i) \times q_\varsigma),$$

where app_cos(.) and app_sin(.) are approximations of cos(.) and sin(.). The calculations could be performed using a fixed-point representation, a look-up table, and/or linear interpolation.

Note that (x̂, ŷ, ẑ) may be different from (x, y, z) due to various reasons, such as quantization, approximations, model imprecision, model parameters imprecisions, or the like.

$(r_x, r_y, r_z)$ can be the reconstruction residuals defined as follows:

$$r_x = x - \hat{x}$$
$$r_y = y - \hat{y}$$
$$r_z = z - \hat{z}$$

With this technique, G-PCC encoder 200 may proceed as follows:
1) Encode the model parameters t̃(i) and z̃(i) and the quantization parameters $q_r$, $q_\varsigma$, $q_\theta$ and $q_\phi$
2) Apply the geometry predictive scheme described in the text of ISO/IEC FDIS 23090-9 Geometry-based Point Cloud Compression, ISO/IEC JTC 1/SC29/WG 7 m55637, Teleconference, October 2020, to the representation (r̃, ϕ̃, i).

A new predictor leveraging the characteristics of LIDAR may be introduced. For instance, the rotation speed of the LIDAR scanner around the z-axis is usually constant. Therefore, G-PCC encoder 200 could predict the current ϕ̃(j) as follows:

$$\tilde{\phi}(j) = \tilde{\phi}(j-1) + n(j) \times \delta_\phi(k)$$

Where
$(\delta_\phi(k))_{k=1 \ldots K}$ is a set of potential speeds G-PCC encoder 200 may use. The index k may be explicitly written to a bitstream or may be inferred from the context based on a deterministic strategy applied by both G-PCC encoder 200 and G-PCC decoder 300, and n(j) is the number of skipped points which may be explicitly written to the bitstream or may be inferred from the context based on a deterministic strategy applied by both G-PCC encoder 200 and G-PCC decoder 300. n(j) is also referred to as a "phi multiplier" herein. Note, the phi multiplier is currently used only with the delta predictor.

3) Encode with each node the reconstruction residuals ($r_x$, $r_y$, $r_z$)

G-PCC decoder 300 may proceed as follows:
1) Decode the model parameters $\tilde{t}(i)$ and $\tilde{z}(i)$ and the quantization parameters $q_r$, $q_c$, $q_\theta$ and $q_\phi$
2) Decode the ($\tilde{r}$, $\tilde{\phi}$, i) parameters associated with the nodes according to the geometry predictive scheme described in the text of ISO/IEC FDIS 23090-9 Geometry-based Point Cloud Compression, ISO/IEC JTC 1/SC29/WG 7 m55637, Teleconference, October 2020.
3) Compute the reconstructed coordinates ($\hat{x}$, $\hat{y}$, $\hat{z}$) as described above
4) Decode the residuals ($r_x$, $r_y$, $r_z$)

As discussed in the next section, lossy compression could be supported by quantizing the reconstruction residuals ($r_x$, $r_y$, $r_z$)

5) Compute the original coordinates (x, y, z) as follows $$x = r_x + \hat{x}$$

$$y = r_y + \hat{y}$$

$$z = r_z + \hat{z}$$

Lossy compression may be achieved by applying quantization to the reconstruction residuals ($r_x$, $r_y$, $r_z$) or by dropping points.

The quantized reconstruction residuals may be computed as follows:

$$\tilde{r}_x = \text{sign}\ (r_x) \times \text{floor}\left(\frac{|r_x|}{q_x} + o_x\right)$$

$$\tilde{r}_y = \text{sign}\ (r_y) \times \text{floor}\left(\frac{|r_y|}{q_y} + o_y\right)$$

$$\tilde{r}_z = \text{sign}\ (r_z) \times \text{floor}\left(\frac{|r_z|}{q_z} + o_z\right)$$

Where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively. For example, G-PCC encoder 200 or G-PCC decoder 300 may compute the quantized residuals.

G-PCC encoder 200 or G-PCC decoder 300 may use trellis quantization to further improve the RD (rate-distortion) performance results.

The quantization parameters may change at sequence/frame/slice/block level to achieve region adaptive quality and/or for rate control purposes.

Inter prediction in G-PCC predictive geometry coding is now discussed. Information regarding G-PCC predictive geometry coding may be found in Technologies under consideration in G-PCC, ISO/IEC JTC 1/SC29/WG 7 MDS20648, Teleconference, July 2021; A. K. Ramasubramonian, B. Ray, L. Pham Van, G. Van der Auwera, M. Karczewicz, [G-PCC] [New] Inter prediction with predictive geometry coding, ISO/IEC JTC1/SC29/WG7 m56117, January 2021; A. K. Ramasubramonian, L. Pham Van, G. Van der Auwera, M. Karczewicz, [G-PCC] EE13.2 report on inter prediction, Test 2, ISO/IEC JTC1/SC29/WG7 m56839, April 2021; and A. K. Ramasubramonian, G. Van der Auwera, L. Pham Van, M. Karczewicz, [G-PCC][EE13.2-related] Additional results for inter prediction for predictive geometry, ISO/IEC JTC1/SC29/WG7 m56841, April 2021.

Predictive geometry coding uses a prediction tree structure to predict the positions of points. When angular coding is enabled, the x, y, z coordinates are transformed to radius, azimuth and laserID and residuals may be signaled in these three coordinates as well as in the x, y, z dimensions. The intra prediction used for radius, azimuth and laserID may be one of four modes and the predictors are nodes that are classified as parent, grand-parent, and great-grandparent in the prediction tree with respect to the current node. The predictive geometry coding, as designed in G-PCC Ed. 1, is an intra coding tool as it only uses points in the same frame for prediction. Additionally, using points from previously decoded frames may provide a better prediction and thus better compression performance.

For inter prediction, as initially proposed in A. K. Ramasubramonian, B. Ray, L. Pham Van, G. Van der Auwera, M. Karczewicz, [G-PCC] [New] Inter prediction with predictive geometry coding, ISO/IEC JTC1/SC29/WG7 m56117, January 2021 and A. K. Ramasubramonian, L. Pham Van, G. Van der Auwera, M. Karczewicz, [G-PCC] EE13.2 report on inter prediction, Test 2, ISO/IEC JTC1/SC29/WG7 m56839, April 2021, the proposal was to predict the radius of a point from a reference frame. For each point in the prediction tree, G-PCC decoder 300 may determine whether the point is inter predicted or intra predicted (e.g., G-PCC encoder 200 may indicate such inter prediction or intra prediction by a flag which G-PCC encoder 200 may signal in the bitstream). When intra predicted, the intra prediction modes of predictive geometry coding are used. When inter-prediction is used, the azimuth and laserID are still predicted with intra prediction, while the radius is predicted from the point in the reference frame that has the same laserID as the current point and an azimuth that is closest to the current azimuth. A further change to this technique in A. K. Ramasubramonian, G. Van der Auwera, L. Pham Van, M. Karczewicz, [G-PCC][EE13.2-related] Additional results for inter prediction for predictive geometry, ISO/IEC JTC1/SC29/WG7 m56841, April 2021, also enables inter prediction of the azimuth and laserID in addition to radius prediction. When inter-coding is applied, the radius, azimuth and laserID of the current point are predicted based on a point that is near the azimuth position of a previously decoded point in the reference frame. In addition, separate sets of contexts are used for inter and intra prediction.

Figure 7:
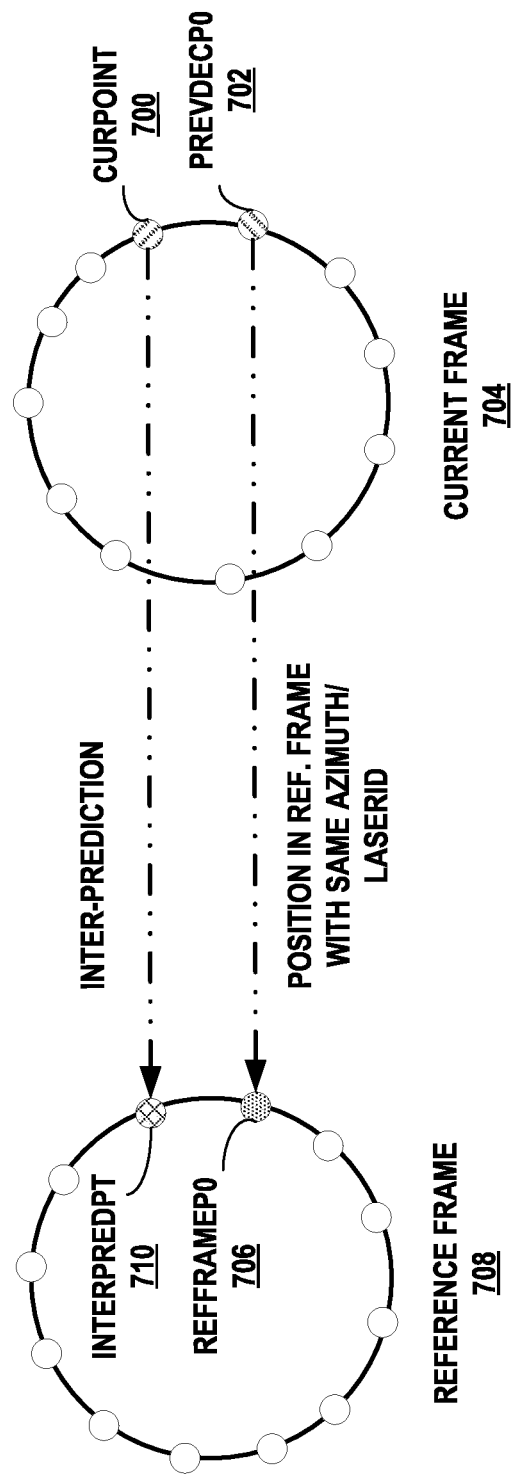
FIG. 7 is a conceptual diagram illustrating an example of inter-prediction of a current point from a point in a reference frame, in accordance with one or more techniques of this disclosure.

FIG. 7 is a conceptual diagram illustrating an example of inter-prediction of a current point from a point in a reference frame. The extension of inter prediction to azimuth, radius, and laserID includes the following steps which, for example, may be performed by G-PCC decoder 300:
1) For a given point (e.g., the current point curPoint 700 in current frame 704), choose the previous decoded point (prevDecP0 702).
2) Choose a position (e.g., refFrameP0 706) in reference frame 70 that has same scaled azimuth and laserID as prevDecP0 702.
3) In reference frame 708, find the first point (interPredPt 710) that has azimuth greater than that of refFrameP0 706.

Figure 8:
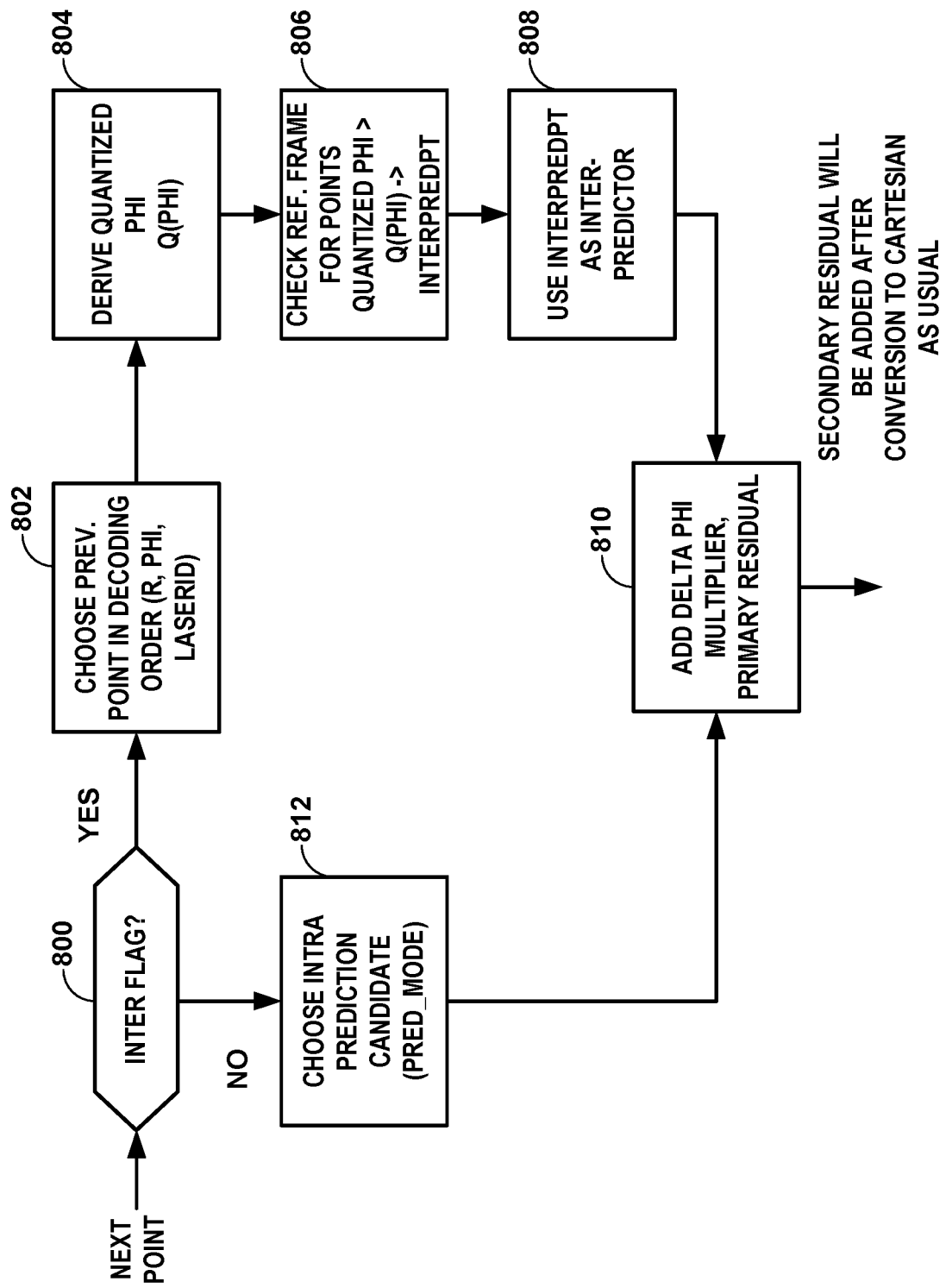
FIG. 8 is a flow diagram illustrating operation of a G-PCC decoder, in accordance with one or more techniques of this disclosure.

FIG. 8 is a flow diagram illustrating operation of a G-PCC decoder. FIG. 8 illustrates the decoding flow associated with the "inter_flag" that is signaled for every point. The technique is available in InterEM-v3.0.

For example, G-PCC decoder 300 may determine whether the inter flag is true (e.g., equal to 1) (800). If the inter flag is true (the "YES" path from block 800), G-PCC decoder 300 may choose a previous decoded point in decoding order using radius, azimuth, and laserID (802). G-PCC decoder 300 may derive a quantized phi, Q(phi) (e.g., a quantized value of the azimuth) of the chosen previous decoded point (e.g., prevDecP0 702) (804). G-PCC decoder 300 may check the reference frame (e.g., reference frame 708 of FIG. 7) for points where the quantized phi of such points is greater than Q(phi) which may lead to interPredPt 710 (806). G-PCC decoder 300 may then use interPredPt 710 as an inter-predictor for the current point, curPoint 700 (808). G-PCC decoder 300 may then add a delta phi multiplier, e.g., n(j)×δ$_\phi$(k) as discussed above, to the primary residual (810).

If the inter flag is false (e.g., is equal to 0) (the "NO" path from block 800), G-PCC decoder 300 may choose an intra prediction candidate (812) and apply intra prediction. G-PCC decoder 300 may then add a delta phi multiplier to yield the primary residual (810).

Figure 9:
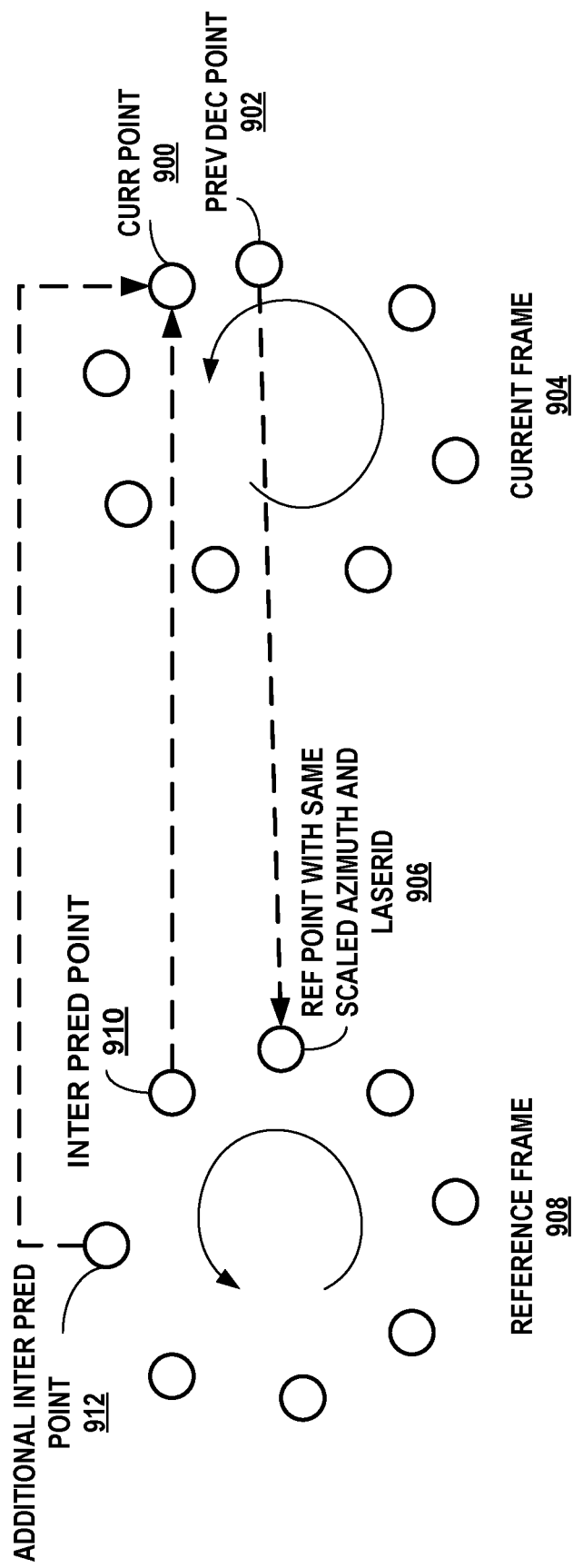
FIG. 9 is a conceptual diagram illustrating an example of an additional inter predictor point obtained from the first point that has an azimuth greater than the inter predictor point, in accordance with one or more techniques of this disclosure.

FIG. 9 is a conceptual diagram illustrating an example of an additional inter predictor point obtained from the first point that has an azimuth greater than the inter predictor point. An additional predictor candidate is now discussed. Information relating to the additional predictor candidate may be found in K. L. Loi, T. Nishi, T. Sugio, [G-PCC] [New]Inter Prediction for Improved Quantization of Azimuthal Angle in Predictive Geometry Coding, ISO/IEC JTC1/SC29/WG7 m57351, July 2021. In the inter prediction technique for predictive geometry described above, the radius, azimuth and laserID of the current point are predicted based on a point that is near the collocated azimuth position in the reference frame when inter coding is applied, for example, by G-PCC decoder 300, using the following steps:

1) for a given point (e.g., a current point, Curr Point 900), choose the previous decoded point (e.g., Prev Dec Point 902),
2) choose a position (e.g., Ref Point 906) in reference frame 908 that has the same scaled azimuth and laserID as the previous decoded point (e.g., Prev Dec Point 902),
3) choose a position (Inter Pred Point 910) in reference frame 908 from the first point that has azimuth greater than the position in reference frame 908 that has the same scaled azimuth and laserID as the previous decoded point (e.g., Prev Dec Point 902), to be used as the inter predictor point.

This technique adds an additional inter predictor point 912 that is obtained by finding the first point that has an azimuth greater than the inter predictor point (e.g., Inter Pred Point 910) as shown in FIG. 9. Additional signaling is used to indicate which of the predictors is selected if inter coding has been applied by G-PCC encoder 200. For example, G-PCC encoder 200 may signal to G-PCC decoder 300 which of the predictors is selected.

Improved inter prediction flag coding is now discussed. Information regarding improved inter prediction flag coding may be found in A. K. Ramasubramonian, L. Pham Van, G. Van der Auwera, M. Karczewicz, [G-PCC] [New proposal] Improvements to inter prediction using predictive geometry coding, ISO/IEC JTC1/SC29/WG7 m57299, July 2021. An improved context selection algorithm may be applied for coding the inter prediction flag. G-PCC encoder 200 may use the inter prediction flag values of the five previously coded points to select the context of the inter prediction flag in predictive geometry coding.

The inter prediction technique for predictive geometry coding relies on searching inter prediction points in the reference frame as described above. Contrary to two-dimensional (2D) video coding, these points are not localized on a regular 2D array sampling grid. In addition, in 2D video coding the 2D array sampling grid allows for relatively simple interpolation filters to be applied on a block-by-block basis to obtain subpixel accurate prediction blocks (e.g., half, one-quarter, one-eighth subpixel, etc.), which offers considerable coding efficiency for inter coding. Similarly, interpolation for inter prediction for predictive geometry coding may be expected to have coding efficiency benefits. However, interpolation on an irregular sampling grid is complicated due to the varying spacings between samples.

In accordance with the techniques of this disclosure, any of the following techniques may be applied independently or in a combined manner (e.g., in any combination).

Although the discussion in this disclosure is predominantly directed to the polar coordinate system, techniques disclosed in this application may also apply to other coordinate systems such as Cartesian, spherical, or any custom coordinate system that may be used to represent/code the point cloud positions and attributes. In particular, G-PCC utilizes the radius and azimuthal angle from the spherical coordinate system in combination with a laser identifier or laserID (e.g., elevation angle) from the LIDAR sensor that captured the point.

At least one radius interpolation technique may be applied to at least two points belonging to a reference point cloud frame to obtain at least one radius inter predictor for at least one current point in a current point cloud frame. A reference point cloud frame may be a frame of point cloud data whose point(s) may be used as reference(s) when predicting a at least one current point in a current frame of point cloud data. A radius inter predictor may be a predictor derived from point(s) of a reference point cloud frame that may be used to predict a radius of at least one current point in the current point cloud frame.

G-PCC encoder 200 or G-PCC decoder 300 may select the at least two reference points. The at least two reference points may be at least two points in the reference point cloud frame that are used to obtain at least one radius inter predictor. The at least two reference points may be selected in the reference point cloud frame according to a technique as follows: In general, the at least two reference points may be a grouping of reference points belonging to a reference point cloud frame (e.g., reference frame 908) within a range of azimuth angles, laserIDs, and/or radiuses. The purpose of the grouping is to apply at least one radius interpolation technique to the points belonging to the group for generating radius inter predictors for at least one current point (e.g., Curr Point 900) in a current point cloud frame (e.g., current frame 904). The reference point cloud frame may have been partially modified to compensate for motion, for example, by global motion such as rotation (or affine, perspective, etc.) and/or translation, or local motion (for example, region-based motion). For example, if the LIDAR system is on or in an automobile, and the automobile makes a turn, G-PCC encoder 200 or G-PCC decoder 300 may apply global motion compensation. The purpose of the motion compensation is to obtain spatial alignment between the points of the reference point cloud frame and the points of the current point cloud frame, which results in better inter predictors.

The position coordinates of the reference points or current point may be quantized, approximated, scaled, etc. For example, G-PCC encoder 200 or G-PCC decoder 300 may quantize, approximate, scale, or the like, the position coordinates of the reference points or the current point. For example, G-PCC decoder 300 may determine the accuracy or representation bit depth of the positions by parsing signaled parameters in the bitstream, or G-PCC decoder 300 may construct an array or map of the reference point cloud positions with array cell or bin sizes that quantize the point coordinates, for example, which G-PCC decoder 300 may determine by parsing signaled parameters in the bitstream.

The at least two reference points may have identical (or similar, for example, adjacent) laserIDs and may be ordered according to their azimuth angles in the reference point cloud frame, either in increasing or decreasing azimuth order. An adjacent laserID may be a laserID that is one higher or lower than another laserID. If azimuth angles are identical, they may be further ordered according to radius, either in increasing or decreasing order. For example, G-PCC encoder 200 or G-PCC decoder 300 may order the at least two reference points.

The at least two reference points may have identical (or similar, for example, adjacent) azimuth angles and may be ordered according to their laserIDs in the reference point cloud frame, either in increasing or decreasing laserID order. An adjacent azimuth angle may be an azimuth angle that is one azimuth angle higher or lower than another azimuth angle. If laserIDs are identical, they may be further ordered according to radius, either in increasing or decreasing order.

In general, the position of the group of reference points belonging to the reference point cloud frame is related to the position of the current points in the current frame to be inter predicted. The reference point positions may have been partially modified by motion compensation. For example, G-PCC encoder 200 or G-PCC decoder may partially modify the reference point positions using motion compensation.

The positions of at least two reference points may be determined by the azimuth angle and laserID of the current point in the current point cloud frame that is to be inter predicted. For example, G-PCC encoder 200 may determine the positions of the at least two reference points using the azimuth angle and laserID of the current point.

The position of the first of the at least two reference points with laserID equal to the current point's laserID, may be determined by searching for the nearest azimuth angle that is smaller than the azimuth angle of the current point, and the position of the second of the at least two reference points may be determined by searching for the nearest azimuth angle that is greater than the azimuth angle of the current point.

Additional reference points may be determined by searching for the second and next nearest points with azimuths smaller or greater than the current point's azimuth. The number of additional reference points may depend on the radius interpolation method that is applied to the reference points. For example, a radius interpolation method may be averaging, weighted averaging, linear interpolation, mathematical trigonometry, radius interpolation filtering using a filter having more than two coefficients, grouping points on a segment, or any other interpolation method.

The position of the first of the at least two reference points with azimuth angle equal to the current point's azimuth angle currAzim, may be determined (e.g., by G-PCC encoder 200 or G-PCC decoder 300) by searching for the nearest laserID that is smaller than the laserID angle of the current point currLaserId, and the position of the second of the at least two reference points may be determined by searching for the nearest laserID that is greater than the laserID of the current point.

G-PCC encoder 200 or G-PCC decoder 300 may determine additional reference points by searching for the second and next nearest points with laserIDs smaller or greater than the current point's laserID. The number of additional reference points may depend on the interpolation method that is applied to the reference points.

In one example, when there is no position in the reference frame that has the azimuth angle equal to currAzim for a laserID that is searched by one of the techniques disclosed above (e.g., nearest laserID that is smaller than currLaserId, or nearest laserId that is greater than currLaserId, etc.), the position with azimuth that is closest to currAzim may be chosen for the searched laserID.

In general, G-PCC encoder 200 or G-PCC decoder 300 may determine the positions of a group of reference points by a range of azimuth angles and laserIDs, with the range determining a neighborhood of the azimuth angle and laserID of the current point to be predicted. The range may depend on the radius interpolation method to be applied to the reference points. For example, a radius interpolation method may be averaging, weighted averaging, linear interpolation, mathematical trigonometry, radius interpolation filtering using a filter having more than two coefficients, grouping points on a segment, or any other interpolation method.

When one or more points in the group of reference points are unavailable or are duplicate predictors (e.g., same radius as another reference point), G-PCC encoder 200 or G-PCC decoder 300 may choose one or more of the following techniques to substitute for the unavailable/duplicate point:
1) Choose a default predictor (e.g., choose a default radius value);
2) Use a search order for each position in the group of reference points (e.g., when azimuth equal to currAzim is searched with the nearest laserID greater than currLaserId, if the point is unavailable/duplicate, choose the point with the next laserID and the same azimuth as currAzim.);
3) Do not choose a substitute, and do not use the point for interpolation.

Two reference points used for radius interpolation may be chosen equal to the first and second predictor candidates as described above with respect to inter prediction for predictive geometry coding and the additional predictor candidate, e.g., as shown in any of FIGS. 7-9. In general, additional neighboring reference points (e.g., in addition to the two reference points) may be selected in a similar fashion. For example, G-PCC encoder 200 or G-PCC decoder 300 may choose the additional neighboring reference points.

As described above with respect to inter prediction for predictive geometry coding and the additional predictor candidate(s), e.g., as shown in FIGS. 7-9, the reference point locations may be determined using the previously decoded point as described. Alternatively, the parent of the current point may be used to determine the reference points. The parent may be defined as the parent node of the current node in the tree structure that is constructed for the current point cloud frame. Alternatively, the grandparent node or great-grandparent node, etc., can be used.

The at least two reference points from the reference point cloud frame are utilized for a radius interpolation technique as follows for the case with identical laserID values. For example, G-PCC encoder 200 or G-PCC decoder 300 may utilize any of the radius interpolation techniques below. For the case with identical azimuth angles, a similar interpolation may be applied.

G-PCC encoder 200 or G-PCC decoder 300 may apply simple averaging with equal weights applied to the radius values corresponding with each reference point. radius_smaller and radius_greater can be defined as the radius values associated with the reference points with azimuths smaller and greater than the azimuth angle of the current point, respectively. For example: average_radius=½*radius_smaller+½*radius_greater.

G-PCC encoder 200 or G-PCC decoder 300 may apply linear interpolation using the azimuth angles of the reference points and the current point to obtain the predicted radius of the current point. Let current_azimuth be the azimuth angle associated with the current point, and let ref_smaller_azimuth and ref_greater_azimuth be the azimuths associated with the reference points respectively smaller and greater than the azimuth of the current point. For example:

Weight1=(current_azimuth−ref_smaller_azimuth)/
(ref_greater_azimuth−ref_smaller_azimuth
Weight2=(ref_greater_azimuth−current_azimuth)/
(ref_greater_azimuth−ref_smaller_azimuth) or, equivalently, (1.0−Weight1)
linear_interpolated_radius=Weight2*radius_smaller+ Weight1*radius_greater G-PCC encoder 200 or G-PCC decoder 300 may apply mathematical trigonometry to calculate the interpolated radius as illustrated with the following pseudocode. Let predRight[1] and predLeft[1] be the azimuth angles respectively greater than and smaller than the azimuth of the current point; let predRight[0] and predLeft[0] be the radius values associated with these azimuths; and geom_angular_azimuth_scale be a parameter indicating the representation accuracy or bit depth of the azimuth angles.

```
if (predRight[1] != predLeft[1]) {
    double scalePhi = (1 << _geom_angular_azimuth_scale_log2);
    double phiDelta = ((double)predRight[1] - (double)predLeft[1]) * 2.0 * M_PI
/ scalePhi; // conversion to radians
    double alphaDelta = ((double)predRight[1] - (double)point[1]) * 2.0 * M_PI /
scalePhi; // conversion to radians
    double sinPhiD = sin(phiDelta);
    double cosPhiD = cos(phiDelta);
    double sinAlphaD = sin(alphaDelta);
    double cosAlphaD = cos(alphaDelta);
    double Rleft = predLeft[0];
    double Rright = predRight[0];
    double predR = (-sinPhiD * Rleft * Rright) / ((sinAlphaD * cosPhiD -
cosAlphaD * sinPhiD) * Rleft - sinAlphaD * Rright);
    predR0 = (int32_t)(predR >= 0 ? predR + 0.5 : predR - 0.5); // rounding
}
```

G-PCC encoder 200 or G-PCC decoder 300 may use more than two reference points, for example, four, six, or eight reference points, for a radius interpolation filter with more than two coefficients, for example a cubic interpolation filter. Since the azimuth spacings between these reference points may be irregular, the interpolation filter may be adaptively generated to fit these azimuth spacings.

Multiple reference points may be grouped in a segment or block to generate interpolated radius predictors for multiple current points that are grouped in a corresponding segment or block. For example, G-PCC encoder 200 or G-PCC decoder 300 may group multiple reference points to generate interpolated radius predictors.

A condition may be checked before applying a radius interpolation technique. For example, G-PCC encoder 200 or G-PCC decoder 300 may perform the condition check. For example, the difference between two radius values associated with two reference points may need to be smaller than a threshold: ABS (radius1−radius2)<threshold, where ABS is the absolute value. For example, if one potential reference point is on a road sign near G-PCC encoder 200 and the other potential reference point is on a building 100 meters away, performing a radius interpolation between two potential reference points may not yield an accurate predicted radius. This threshold value may be signaled in the bitstream or may be a predetermined constant. Alternatively, multiple threshold ranges may be specified for abs(radius1−radius2), and for each threshold range a different interpolation scheme may be applied. For example, if ABS (radius1−radius2) <threshold1, a linear interpolation may be applied. But if threshold1<ABS (radius1−radius2)<threshold2, a cubic interpolation may be applied, and if ABS (radius1−radius2)>threshold2, no interpolation may be applied.

The applied interpolation technique type (e.g., average, linear, cubic, etc.) may be signaled in the bitstream, for example, per current point, per current segment/block, per slice, per frame, per sequence, etc. In addition, the coefficients or weights of the interpolation may be signaled in the bitstream. For example, G-PCC encoder 200 may signal such syntax elements in the bitstream.

If the two reference points are chosen, e.g., as shown in any of FIGS. 7-9, G-PCC encoder 200 or G-PCC decoder 300 may obtain the interpolated radius by simple averaging of the two radius values corresponding with the two reference points. Alternatively, a weighted average may be applied, or another interpolation technique as described above may be used. If more than two reference points are chosen, an interpolation technique that utilizes more than two points may be applied.

After the interpolated radius predictor is obtained, G-PCC encoder 200 may compute a radius residual between the current point's radius and the predicted radius. For example, G-PCC encoder 200 may subtract the current point's radius from the predicted radius, or subtract the predicted radius from the current point's radius to compute the radius residual. This residual is coded in the bitstream. G-PCC decoder 300 may obtain the same interpolated radius predictor, decode the radius residual from the bitstream and add the radius residual to the radius predictor to obtain the current point's radius.

The radius residual, e.g., including sign and absolute value, may be context coded with an arithmetic coder. The radius residual may be quantized.

Contexts for coding the radius residual obtained with inter prediction may be separate from contexts for coding a radius residual obtained with intra prediction.

The azimuth angle of the current point to be predicted, which may be used to determine the interpolation location between the reference points, may require that the azimuth angle of the current point be decoded before the radius can be predicted.

Decoding the azimuth of the current point can include obtaining an azimuth predictor and decoding an azimuth residual. In some examples, decoding the azimuth residual is dependent on the decoded radius of the current point to determine the inverse quantizer, inverse scaling or representation bit depth of the azimuth residual. This leads to a causal decoding dependency between azimuth and radius of the current point. For example, G-PCC decoder 300 may decode the azimuth of the current point.

To avoid this causal decoding dependency, the inverse quantization, inverse scaling or representation bit depth of the current azimuthal residual may instead be made dependent on the decoded radius value of a previously reconstructed current point, for example, in decoding order.

Alternatively, the inverse quantization, inverse scaling or representation bit depth of the current azimuthal residual may instead be dependent on the radius value of a reference point in the neighborhood of the current point, for example, the radius of a reference point corresponding with the azimuth of a previously decoded current point.

If two reference points are chosen, e.g., as shown in any of FIGS. 7-9, the azimuth angle of the current point does not need to be coded first and the above dependency on the radius may be avoided.

The following pseudocode implementation of a G-PCC decoder 300 algorithm demonstrates linear radius interpolation for inter prediction for predictive geometry coding. The code is based on TMC13v12, which corresponds with Edition 1 of G-PCC.

```
int
PredGeomDecoder::decodeTree(Vec3<int32_t>* outA,
  std::vector<Vec3<int32_t>>* reconPosSphRef,
  std::vector<RadiusMap>* reconPosSphMapRef,
  Vec3<int32_t>* outB)
{
  QuantizerGeom quantizer(_sliceQp);
  int nodesUntilQpOffset = 0;
  int nodeCount = 0;
  _stack.push_back(-1);
  while (!_stack.empty( )) {
    auto parentNodeIdx = _stack.back( );
    _stack.pop_back( );
    if (_geom_scaling_enabled_flag && !nodesUntilQpOffset--) {
      int qpOffset = decodeQpOffset( ) << _geom_qp_multiplier_log2;
      int qp = _sliceQp + qpOffset;
      quantizer = QuantizerGeom(qp);
      nodesUntilQpOffset = _qpOffsetInterval;
    }
    // allocate point in traversal order (depth first)
    auto curNodeIdx = nodeCount++;
    _nodeIdxToParentIdx[curNodeIdx] = parentNodeIdx;
    int numDuplicatePoints = 0;
    if (!_geom_unique_points_flag)
      numDuplicatePoints = decodeNumDuplicatePoints( );
    int numChildren = decodeNumChildren( );
    bool interFlag = false;
    if (_frameIsInter && _geom_angular_mode_enabled_flag && _prevNodeIdx >= 0)
      interFlag = decodeInterFlag( );
    GPredicter::Mode mode = GPredicter::Mode(0);
    if (!interFlag)
      mode = decodePredMode( );
    int qphi = decodePhiMultiplier(mode, interFlag);
    auto predicter = makePredicter(curNodeIdx, mode, _minVal, [&](int idx) {
      return _nodeIdxToParentIdx[idx];
    });
    auto pred = predicter.predict(outA, mode, _geom_angular_mode_enabled_flag);
    auto predintra = pred;
    // Inter predictor
    bool interPredEligible =
      _frameIsInter && _geom_angular_mode_enabled_flag && _prevNodeIdx >= 0;
    bool predInterAvail = false;
    point_t prevPoint;
    if (mode == GPredicter::Mode(0) && interPredEligible)
    {
      prevPoint = outA[_prevNodeIdx];
      int laserIdx = prevPoint[2];
      int azimuthRange = (1 << _geom_angular_azimuth_scale_log2) + 4;
      int azimuthBin = std::max(1, _geomAngularAzimuthSpeed >> 1);
      int azimuthIdxOffset = (azimuthRange + azimuthBin) / (azimuthBin << 1);
      int azimuthRound = prevPoint[1] < 0 ? -(azimuthBin >> 1) : (azimuthBin >> 1);
      int azimuthIdx = (prevPoint[1] + azimuthRound) / azimuthBin + azimuthIdxOffset;
      // Search next occupied node:
      azimuthIdx++;
      int numLasers = _numLasers;
      int mapidx = azimuthIdx*numLasers + laserIdx; // next index in ref map
      int mapRefSize = (*reconPosSphMapRef).size( );
      int predidx = -1;
      while (!predInterAvail && mapIdx < mapRefSize)
      {
        predInterAvail = (*reconPosSphMapRef) [mapIdx].occupied;
        if (predInterAvail)
```

```
          {
            pred = (*reconPosSphMapRef)[mapIdx].cellAvg;
            pred[1] = (*reconPosSphRef)[(*reconPosSphMapRef)[mapIdx].order][ 1 ];
            pred[2] = (*reconPosSphRef)[(*reconPosSphMapRef)[mapIdx].order][2];
          }
          else
          {
            azimuthIdx++;
            mapidx = azimuthIdx*numLasers + laserIdx;
          }
        }
      }
    }
    _prevNodeIdx = curNodeIdx;
    auto residual = decodeResidual(mode, interFlag);
    if (!_geom_angular_mode_enabled_flag)
        for (int k = 0; k < 3; k++)
            residual[k] = int32_t(quantizer.scale(residual[k]));
    if (_geom_angular_mode_enabled_flag)
        if (mode >= 0)
            pred[1] += qphi * _geomAngularAzimuthSpeed;
    auto pos = pred + residual;
    if (interFlag && predInterAvail) {
      bool predInterAvailLeft = false;
      bool predInterAvailRight = false;
      int numLasers = _numLasers;
      int laserIdx = pos[2];
      int azimuthRange = (1 << _geom_angular_azimuth_scale_log2) + 4;
      int azimuthBin = std::max(1, _geomAngularAzimuthSpeed >> 1);
      int azimuthIdxOffset = (azimuthRange + azimuthBin) / (azimuthBin << 1);
      int azimuthRound = pos[l] < 0 ? -(azimuthBin >> 1) : (azimuthBin >> 1);
      int azimuthIdxLeft =
      (pos[1] + azimuthRound) / azimuthBin + azimuthIdxOffset;
      int azimuthIdxRight = azimuthIdxLeft;
      // Search right occupied node for interpolation:
      int mapIdxRight = azimuthIdxRight * numLasers + laserIdx; // right index in ref map
      int predIdx = -1;
      int mapRefSize = (*reconPosSphMapRef).size( );
      point_t predRight = 0;
      while (!predInterAvailRight && mapIdxRight >= 0 && mapIdxRight < mapRefSize)
{
        predInterAvailRight = (*reconPosSphMapRef)[mapIdxRight].occupied;
        if (predInterAvailRight) {
          int numpoints = (*reconPosSphMapRef)[mapIdxRight].numpoints;
          if (numpoints > 1) {
            int min Azimuth = 2147483647;
            int minPredIdx = 0;
            for(int i = 0; i < numpoints; i++) {
              predIdx = (*reconPosSphMapRef)[mapIdxRight].pointOrders[i];
              int diffRight = std::abs((*reconPosSphRef)[predIdx][1] - pos[1]);
              if (diffRight < minAzimuth) {
                minAzimuth = diffRight;
                minPredIdx = predIdx;
              }
            }
            predRight = (*reconPosSphRef) [minPredIdx];
          } else {
            predIdx = (*reconPosSphMapRef)[mapIdxRight].order;
            predRight = (*reconPosSphRef)[predidx];
          }
        } else {
          azimuthIdxRight++;
          mapIdxRight = azimuthIdxRight * numLasers + laserIdx;
        }
      }
      // Search left occupied node for interpolation:
      int mapIdxLeft = azimuthIdxLeft * numLasers + laserIdx; // left index in ref map
      predidx = -1;
      point_t predLeft = 0;
      while (predInterAvailRight && !predInterAvailLeft && mapIdxLeft >= 0 &&
mapIdxLeft < mapRefSize) {
        predInterAvailLeft = (*reconPosSphMapRef) [mapIdxLeft].occupied;
        if (predInterAvailLeft) {
          point_t predLeft;
          int numpoints = (*reconPosSphMapRef)[mapIdxLeft].numpoints;
          if (numpoints > 1) { // && azimuthIdxLeft != azimuthIdxRight) {
            int minAzimuth = 2147483647;
            int minPredIdx = 0;
```

```
            for(int i = 0; i < numpoints; i++) {
                predIdx = (*reconPosSphMapRef)[mapIdxLeft].pointOrders[i];
                int diffLeft = std::abs(pos[1] - (*reconPosSphRef)[predIdx][1]);
                if (diffLeft < minAzimuth) {
                    minAzimuth = diffLeft;
                    minPredIdx = predIdx;
                }
            }
            predLeft = (*reconPosSphRef) [minPredIdx];
          } else {
            predIdx = (*reconPosSphMapRef)[mapIdxLeft].order;
            predLeft = (*reconPosSphRef)[predIdx];
          }
          if (std::abs(predRight[0] - predLeft[0]) < RADIUS_DIFF_TH) {
#if INTERPOL_TRIGONOMETRY
            int predR0 = 0;
            if (predRight[1] != predLeft[1]) {
                double scalePhi = (1 << _geom_angular_azimuth_scale_log2);
                double phiDelta = ((double)predRight[1] - (double)predLeft[1]) * 2.0 * M_PI /
scalePhi;
          double alphaDelta = ((double)predRight[1] - (double)pos[1]) * 2.0 * M_PI /
scalePhi;
          double sinPhiD = sin(phiDelta);
          double cosPhiD = cos(phiDelta);
          double sinAlphaD = sin(alphaDelta);
          double cosAlphaD = cos(alphaDelta);
          double Rleft = predLeft[0];
          double Rright = predRight[0];
          double predR = (-sinPhiD * Rleft * Rright) / ((sinAlphaD * cosPhiD - cosAlphaD
* sinPhiD) * Rleft - sinAlphaD * Rright);
            predR0 = (int32_t)(predR >= 0 ? predR + 0.5 : predR - 0.5);
          } else {
           predR0 = (predLeft[0] + predRight[0] + 1) >> 1;
          }
          pred[0] = predR0;
#else
          double azDiff = predRight[l] - predLeft[l];
          double wR = azDiff > 0 ? (pos[l] - predLeft[l])/azDiff : 0.5;
          double wL =1.0 - wR;
          double predDouble = wL * predLeft[0] + wR * predRight[O];
          int32_t pred0 = (int32_t)(predDouble >= 0 ? predDouble + 0.5 : predDouble -
0.5);
          pred[0] = pred0;
#endif
          pos[0] = pred[0] + residual[0];
        }
      } else {
        azimuthIdxLeft--;
        mapIdxLeft = azimuthIdxLeft * numLasers + laserIdx;
      }
    }
   }
  }
    if (!_geom_angular_mode_enabled_flag)
      for (int k = 0; k < 3; k++)
        pos[k] = std::max(0, pos[k]);
    outA[curNodeIdx] = pos;
    // convert pos from spherical to cartesian, add secondary residual
    if (_geom_angular_mode_enabled_flag) {
      residual = decodeResidual2( );
      for (int k = 0; k < 3; k++)
        residual[k] = int32_t(quantizer.scale(residual[k]));
      assert(pos[2] < _numLasers && pos[2] >= 0);
      pred = origin + _sphToCartesian(pos);
      outB[curNodeIdx] = pred + residual;
      for (int k = 0; k < 3; k++)
        outB[curNodeIdx][k] = std::max(0, outB[curNodeIdx][k]);
    }
    // copy duplicate point output
    for (int i = 0; i < numDuplicatePoints; i++, nodeCount++) {
      outA[nodeCount] = outA[curNodeIdx];
      outB[nodeCount] = outB[curNodeIdx];
    }
    for (int i = 0; i < numChildren; i++)
      _stack.push_back(curNodeIdx);
  }
  return nodeCount;
}
```

Figure 10:
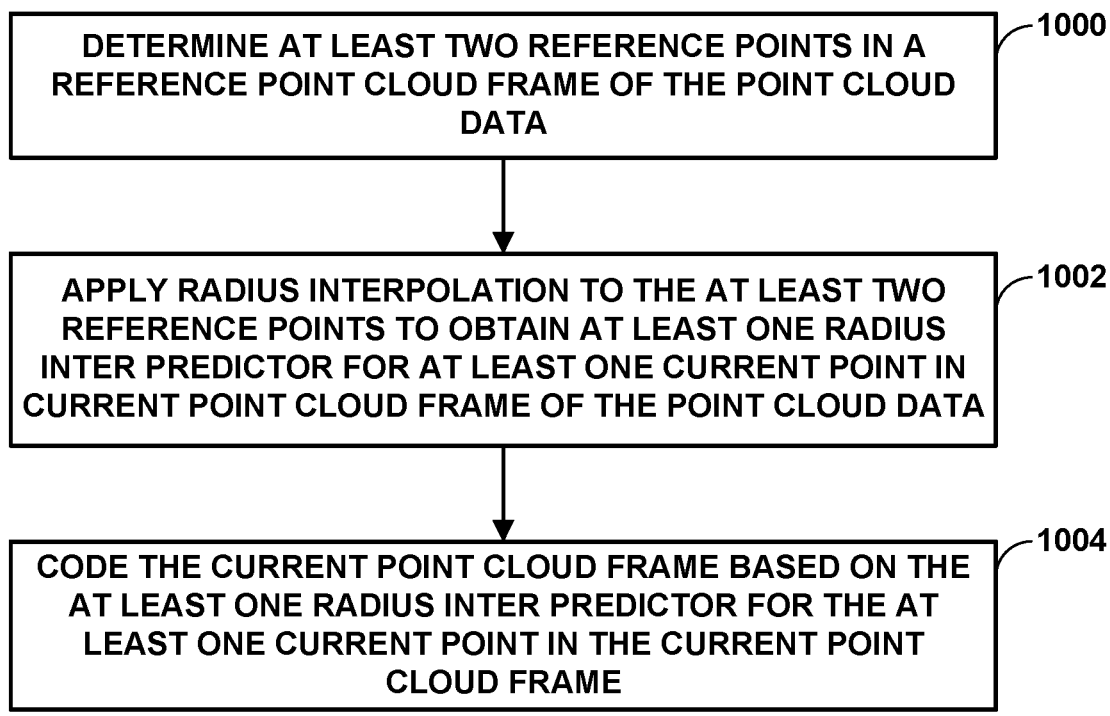
FIG. 10 is a flow diagram illustrating example radius interpolation techniques according to one or more aspects of this disclosure.

FIG. 10 is a flow diagram illustrating example radius interpolation techniques according to one or more aspects of this disclosure. G-PCC encoder 200 or G-PCC decoder 300 may determine at least two reference points in a reference point cloud frame of the point cloud data (1000). For example, G-PCC encoder 200 or G-PCC decoder 300 select at least two reference points (e.g., inter pred point 910 and additional inter pred point 912) in reference frame 908. G-PCC encoder 200 or G-PCC decoder 300 may apply radius interpolation to the at least two reference points to obtain at least one radius inter predictor for at least one current point in a current point cloud frame of the point cloud data (1002). For example, G-PCC encoder 200 or G-PCC decoder 300 may apply any of the radius interpolation techniques described herein to the at least two reference points to obtain at least one radius inter predictor for the current point. G-PCC encoder 200 or G-PCC decoder 300 may code the current point cloud frame based on the at least one radius inter predictor for the at least one current point in the current point cloud frame (1004). For example, G-PCC encoder 200 may encode the current point cloud frame using the at least one radius inter predictor for the at least one current point and G-PCC decoder 300 may decode the current point cloud frame using the at least one radius inter predictor for the at least one current point.

In some examples, the at least two reference points belong to a group of reference points within a range of at least one of azimuth angles, laser identifiers, or radiuses. In some examples, G-PCC encoder 200 or G-PCC decoder 300 may compensate the reference point cloud frame for motion by applying at least one of rotation, translation, or local motion.

In some examples, G-PCC encoder 200 or G-PCC decoder 300 may at least one of quantize, approximate, or scale at least one of position coordinates of the at least two reference points or position coordinates of the at least one current point. In some examples, G-PCC encoder 200 may signal or G-PCC decoder 300 may parse a bit depth of the at least one of the position coordinates of the at least two reference points or the position coordinates of the at least one current point. In some examples, G-PCC encoder 200 or G-PCC decoder 300 may construct an array of or a map of the position coordinates of the at least two reference points to quantize the position coordinates of the at least two reference points.

In some examples, the at least two reference points have identical or similar (e.g., within a predefined range) laser identifiers. In some examples, G-PCC encoder 200 or G-PCC decoder 300 may order the at least two reference points according to a respective azimuth angle associated with the at least two reference points. In some examples, the at least two reference points have identical azimuth angles. In some examples, G-PCC encoder 200 or G-PCC decoder 300 may further order the at least two reference points according to a respective radius associated with the at least two reference points.

In some examples, the at least two reference points have identical or similar (e.g., within a predefined range) azimuth angles. In some examples, G-PCC encoder 200 or G-PCC decoder 300 may order the at least two reference points according to a respective laser identifier associated with the at least two reference points. In some examples, the at least two reference points have identical laser identifiers. In some examples, G-PCC encoder 200 or G-PCC decoder 300 may further order the at least two reference points according to a respective radius associated with the at least two reference points.

In some examples, a position of the at least two reference points is associated with a position of the at least one current point. In some examples, G-PCC encoder 200 or G-PCC decoder 300 may determine positions of the at least two reference points based on an azimuth angle and laser identifier of a first current point of the at least one current point. In some examples, when determining positions of the at least two reference points, G-PCC encoder 200 or G-PCC decoder 300 may search for a first nearest azimuth angle that is smaller than an azimuth angle of the first current point to determine a position of a first reference point of the at least two reference points and searching for a second nearest azimuth angle that is greater than the azimuth angle of the first current point to determine a position of the second reference point of the at least two reference points.

In some examples, when determining positions of the at least two reference points G-PCC encoder 200 or G-PCC decoder 300 may search for a first nearest laser identifier (ID) that is smaller than a laser ID of the first current point to determine a position of a first reference point of the at least two reference points and searching for a second nearest laser ID that is greater than the laser ID of the first current point to determine a position of the second reference point of the at least two reference points.

In some examples, G-PCC encoder 200 or G-PCC decoder 300 may determine positions of the at least two reference points based on a range of azimuth angles and laser identifiers. In some examples, the range of azimuth angles and laser identifiers is based on a radius interpolation method to be applied to the at least two reference points.

In some examples, one or more reference points of the at least two reference points are unavailable or include a duplicate predictor. In some examples, G-PCC encoder 200 or G-PCC decoder 300 may replace an unavailable predictor or a duplicate predictor with a default predictor or a reference point with a next nearest laser identifier, a next nearest azimuth angle, or discard the unavailable predictor or the duplicate predictor.

In some examples, the at least two reference points include identical laser identifiers or identical azimuth angles. In some examples, when applying radius interpolation to the at least two reference points, G-PCC encoder 200 or G-PCC decoder 300 may average with equal weights radius values of the at least two reference points, apply linear interpolation to the radius values of the at least two reference points using azimuth angles or laser identifiers of the at least two reference points and the current point to obtain a predicted radius of the current point, or apply mathematical trigonometry to the radius values of the at least two reference points.

In some examples, the at least two reference points include more than two reference points, and when applying radius interpolation to the at least two reference points, G-PCC encoder 200 or G-PCC decoder 300 may apply a radius interpolation filter having more than two coefficients to the more than two reference points.

In some examples, the current point is one point of at least two current points, and G-PCC encoder 200 or G-PCC decoder 300 may group the at least two reference points into a first segment, group the at least two current points into a second segment, and generate a plurality of interpolated radius predictors based on the first segment for the second segment.

In some examples, G-PCC encoder 200 or G-PCC decoder 300 may, prior to applying radius interpolation to the at least two reference points, determine that a difference between a radius value of a first reference point of the at least two reference points and a radius value of a second reference point of the at least two reference points is less than a threshold. In some examples, the threshold is a first threshold, and G-PCC encoder 200 or G-PCC decoder 300 may determining a type of interpolation to apply based on a comparison of the difference between the radius value of a first reference point and the radius value of a second reference point to the first threshold and to a second threshold.

In some examples, G-PCC encoder 200 or G-PCC decoder 300 may at least one of a) signal or parse a syntax element indicative of an applied interpolation method or b) signal or parse a syntax element indicative of a coefficient or weight of interpolation.

In some examples, G-PCC encoder 200 or G-PCC decoder 300 may determine a radius residual. In some examples, G-PCC encoder 200 or G-PCC decoder 300 may context coding the radius residual, wherein contexts for context coding the radius residual are separate from contexts for context coding a radius residual with intra prediction.

In some examples, prior to determining a predicted radius, G-PCC decoder may decode an azimuth residual of the current point. In some examples, an inverse quantization, inverse scaling, or representation bit depth is dependent on a decoded radius value of a previously reconstructed point or a radius value of a reference point of the two or more reference points. In some examples, when determining the at least two reference points in the reference point cloud frame, G-PCC encoder 200 or G-PCC decoder 300 may determine the at least two reference points in the reference point cloud frame using a previously decoded point.

In some examples, when determining the at least two reference points in the reference point cloud frame, G-PCC encoder 200 or G-PCC decoder 300 may determine the at least two reference points in the reference point cloud frame using a parent node, a grandparent node, or a great-grandparent node, of the at least one current point.

In some examples, the at least two reference points include two reference points and when applying radius interpolation to the at least two reference points, G-PCC encoder 200 or G-PCC decoder 300 averages two radius values corresponding to the two reference points. In some examples, when the averaging of the two radius values G-PCC encoder 200 or G-PCC decoder 300 applies a weighted average to the two radius values.

Figure 11:
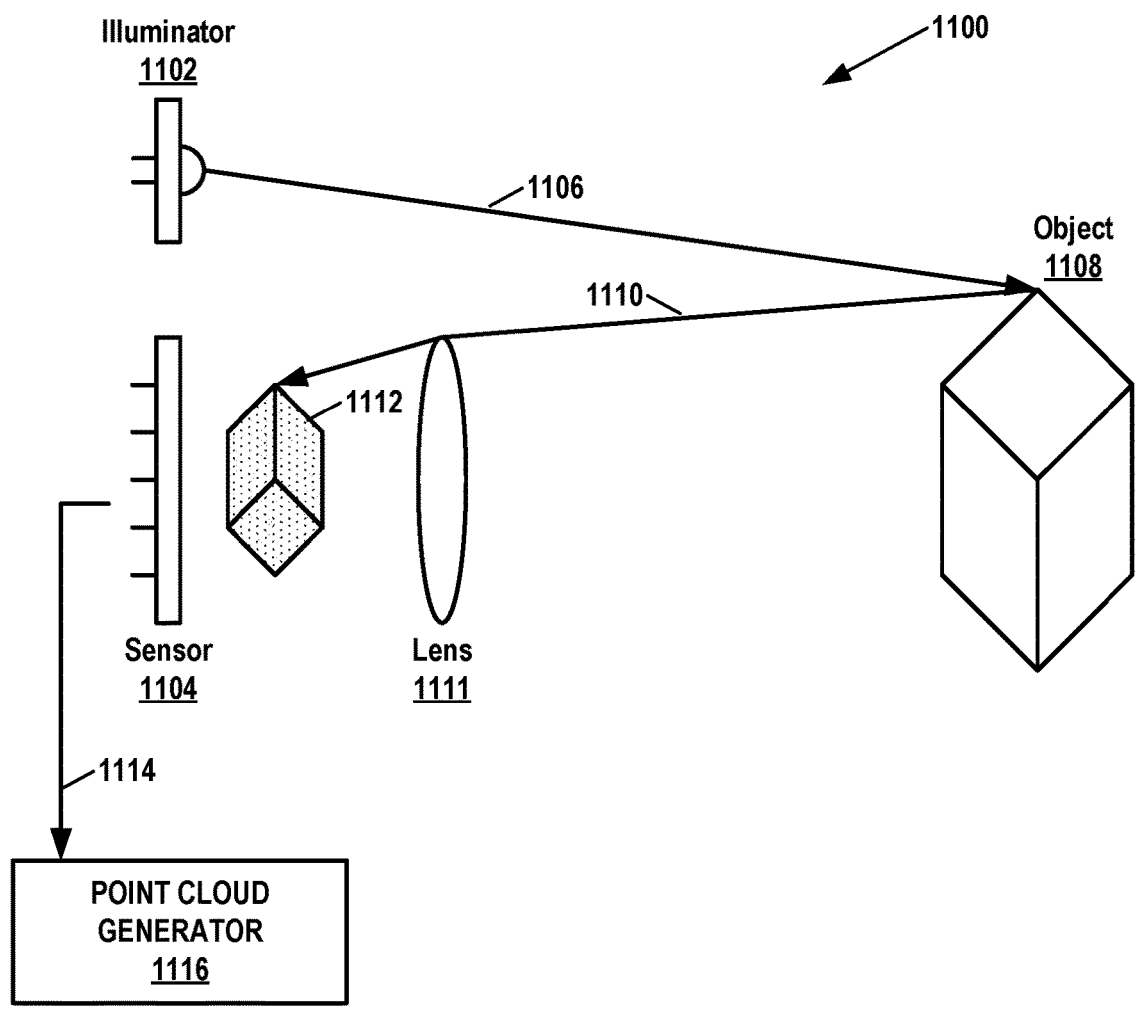
FIG. 11 is a conceptual diagram illustrating an example range-finding system that may be used with one or more techniques of this disclosure.

FIG. 11 is a conceptual diagram illustrating an example range-finding system 1100 that may be used with one or more techniques of this disclosure. In the example of FIG. 11, range-finding system 1100 includes an illuminator 1102 and a sensor 1104. Illuminator 1102 may emit light 1106. In some examples, illuminator 1102 may emit light 1106 as one or more laser beams. Light 1106 may be in one or more wavelengths, such as an infrared wavelength or a visible light wavelength. In other examples, light 1106 is not a coherent, laser light. When light 1106 encounters an object, such as object 1108, light 1106 creates returning light 1110. Returning light 1110 may include backscattered and/or reflected light. Returning light 1110 may pass through a lens 1111 that directs returning light 1110 to create an image 1112 of object 1108 on sensor 1104. Sensor 1104 generates signals 1114 based on image 1112. Image 1112 may comprise a set of points (e.g., as represented by dots in image 1112 of FIG. 11).

In some examples, illuminator 1102 and sensor 1104 may be mounted on a spinning structure so that illuminator 1102 and sensor 1104 capture a 360-degree view of an environment. In other examples, range-finding system 1100 may include one or more optical components (e.g., mirrors, collimators, diffraction gratings, etc.) that enable illuminator 1102 and sensor 1104 to detect ranges of objects within a specific range (e.g., up to 360-degrees). Although the example of FIG. 11 only shows a single illuminator 1102 and sensor 1104, range-finding system 1100 may include multiple sets of illuminators and sensors.

In some examples, illuminator 1102 generates a structured light pattern. In such examples, range-finding system 1100 may include multiple sensors 1104 upon which respective images of the structured light pattern are formed. Range-finding system 1100 may use disparities between the images of the structured light pattern to determine a distance to an object 1108 from which the structured light pattern backscatters. Structured light-based range-finding systems may have a high level of accuracy (e.g., accuracy in the sub-millimeter range), when object 1108 is relatively close to sensor 1104 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1100 is a time of flight (ToF)-based system. In some examples where range-finding system 1100 is a ToF-based system, illuminator 1102 generates pulses of light. In other words, illuminator 1102 may modulate the amplitude of emitted light 1106. In such examples, sensor 1104 detects returning light 1110 from the pulses of light 1106 generated by illuminator 1102. Range-finding system 1100 may then determine a distance to object 1108 from which light 1106 backscatters based on a delay between when light 1106 was emitted and detected and the known speed of light in air). In some examples, rather than (or in addition to) modulating the amplitude of the emitted light 1106, illuminator 1102 may modulate the phase of the emitted light 1106. In such examples, sensor 1104 may detect the phase of returning light 1110 from object 1108 and determine distances to points on object 1108 using the speed of light and based on time differences between when illuminator 1102 generated light 1106 at a specific phase and when sensor 1104 detected returning light 1110 at the specific phase.

In other examples, a point cloud may be generated without using illuminator 1102. For instance, in some examples, sensors 1104 of range-finding system 1100 may include two or more optical cameras. In such examples, range-finding system 1100 may use the optical cameras to capture stereo images of the environment, including object 1108. Range-finding system 1100 may include a point cloud generator 1116 that may calculate the disparities between locations in the stereo images. Range-finding system 1100 may then use the disparities to determine distances to the locations shown in the stereo images. From these distances, point cloud generator 1116 may generate a point cloud.

Sensors 1104 may also detect other attributes of object 1108, such as color and reflectance information. In the example of FIG. 11, a point cloud generator 1116 may generate a point cloud based on signals 1114 generated by sensor 1104. Range-finding system 1100 and/or point cloud generator 1116 may form part of data source 104 (FIG. 1). Hence, a point cloud generated by range-finding system 1100 may be encoded and/or decoded according to any of the techniques of this disclosure.

Figure 12:
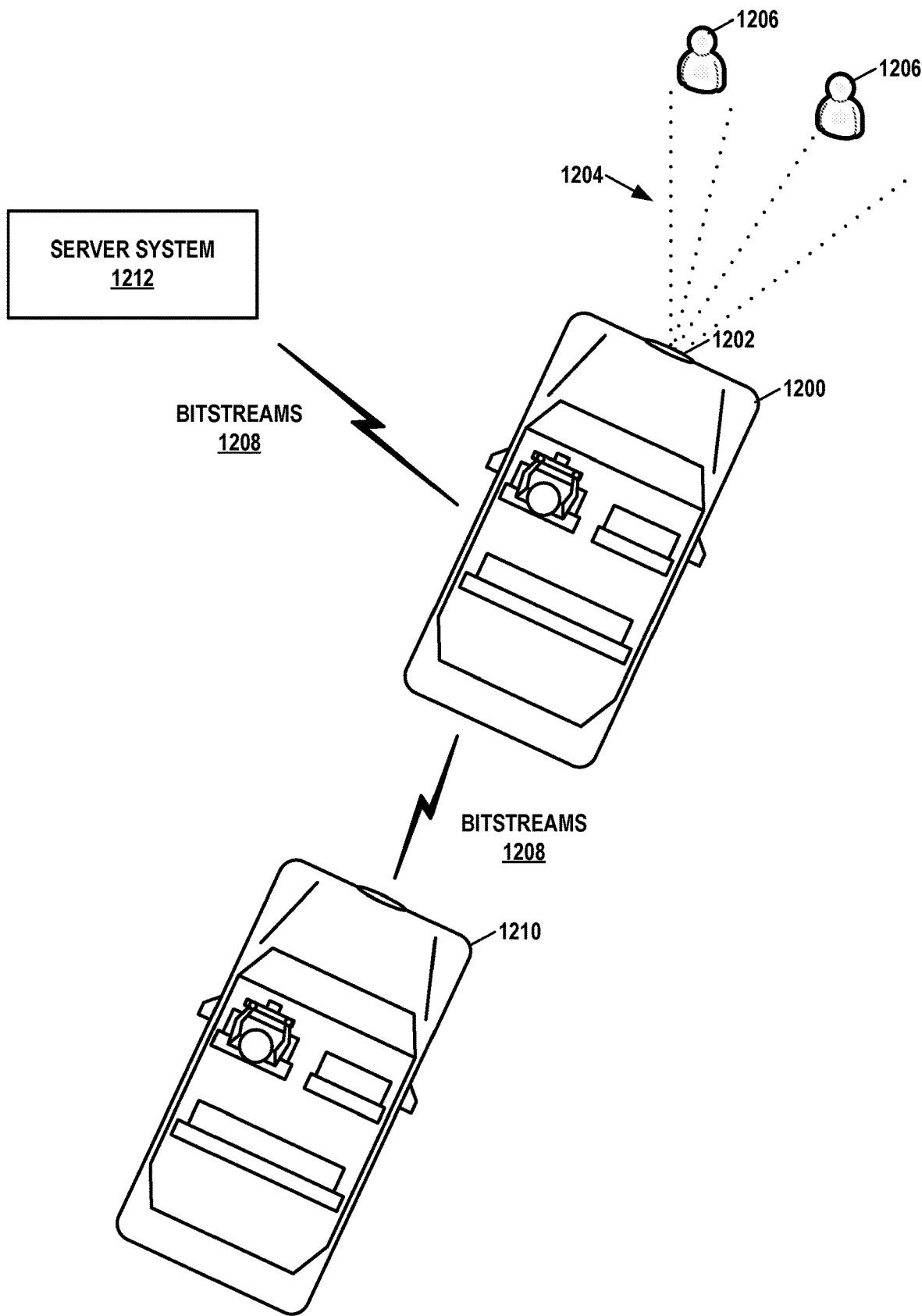
FIG. 12 is a conceptual diagram illustrating an example vehicle-based scenario in which one or more techniques of this disclosure may be used.

FIG. 12 is a conceptual diagram illustrating an example vehicle-based scenario in which one or more techniques of this disclosure may be used. In the example of FIG. 12, a vehicle 1200 includes a range-finding system 1202. Range-finding system 1202 may be implemented in the manner discussed with respect to FIG. 12. Although not shown in the example of FIG. 12, vehicle 1200 may also include a data source, such as data source 104 (FIG. 1), and a G-PCC encoder, such as G-PCC encoder 200 (FIG. 1). In the example of FIG. 12, range-finding system 1202 emits laser beams 1204 that reflect off pedestrians 1206 or other objects in a roadway. The data source of vehicle 1200 may generate a point cloud based on signals generated by range-finding system 1202. The G-PCC encoder of vehicle 1200 may encode the point cloud to generate bitstreams 1208, such as geometry bitstream (FIG. 2) and attribute bitstream (FIG. 2). Bitstreams 1208 may include many fewer bits than the unencoded point cloud obtained by the G-PCC encoder. In some examples, the G-PCC encoder of vehicle 1200 may encode the bitstreams 1208 using radius interpolation as described above. In some examples, the G-PCC decoder of vehicle 1210 may decode the bitstreams 1208 using radius interpolation as described above.

An output interface of vehicle 1200 (e.g., output interface 108 (FIG. 1) may transmit bitstreams 1208 to one or more other devices. Bitstreams 1208 may include many fewer bits than the unencoded point cloud obtained by the G-PCC encoder. Thus, vehicle 1200 may be able to transmit bitstreams 1208 to other devices more quickly than the unencoded point cloud data. Additionally, bitstreams 1208 may require less data storage capacity.

In the example of FIG. 12, vehicle 1200 may transmit bitstreams 1208 to another vehicle 1210. Vehicle 1210 may include a G-PCC decoder, such as G-PCC decoder 300 (FIG. 1). The G-PCC decoder of vehicle 1210 may decode bitstreams 1208 to reconstruct the point cloud. Vehicle 1210 may use the reconstructed point cloud for various purposes. For instance, vehicle 1210 may determine based on the reconstructed point cloud that pedestrians 1206 are in the roadway ahead of vehicle 1200 and therefore start slowing down, e.g., even before a driver of vehicle 1210 realizes that pedestrians 1006 are in the roadway. Thus, in some examples, vehicle 1210 may perform an autonomous navigation operation based on the reconstructed point cloud.

Additionally, or alternatively, vehicle 1200 may transmit bitstreams 1208 to a server system 1212. Server system 1212 may use bitstreams 1208 for various purposes. For example, server system 1212 may store bitstreams 1208 for subsequent reconstruction of the point clouds. In this example, server system 1212 may use the point clouds along with other data (e.g., vehicle telemetry data generated by vehicle 1200) to train an autonomous driving system. In other example, server system 1212 may store bitstreams 1208 for subsequent reconstruction for forensic crash investigations.

Figure 13:
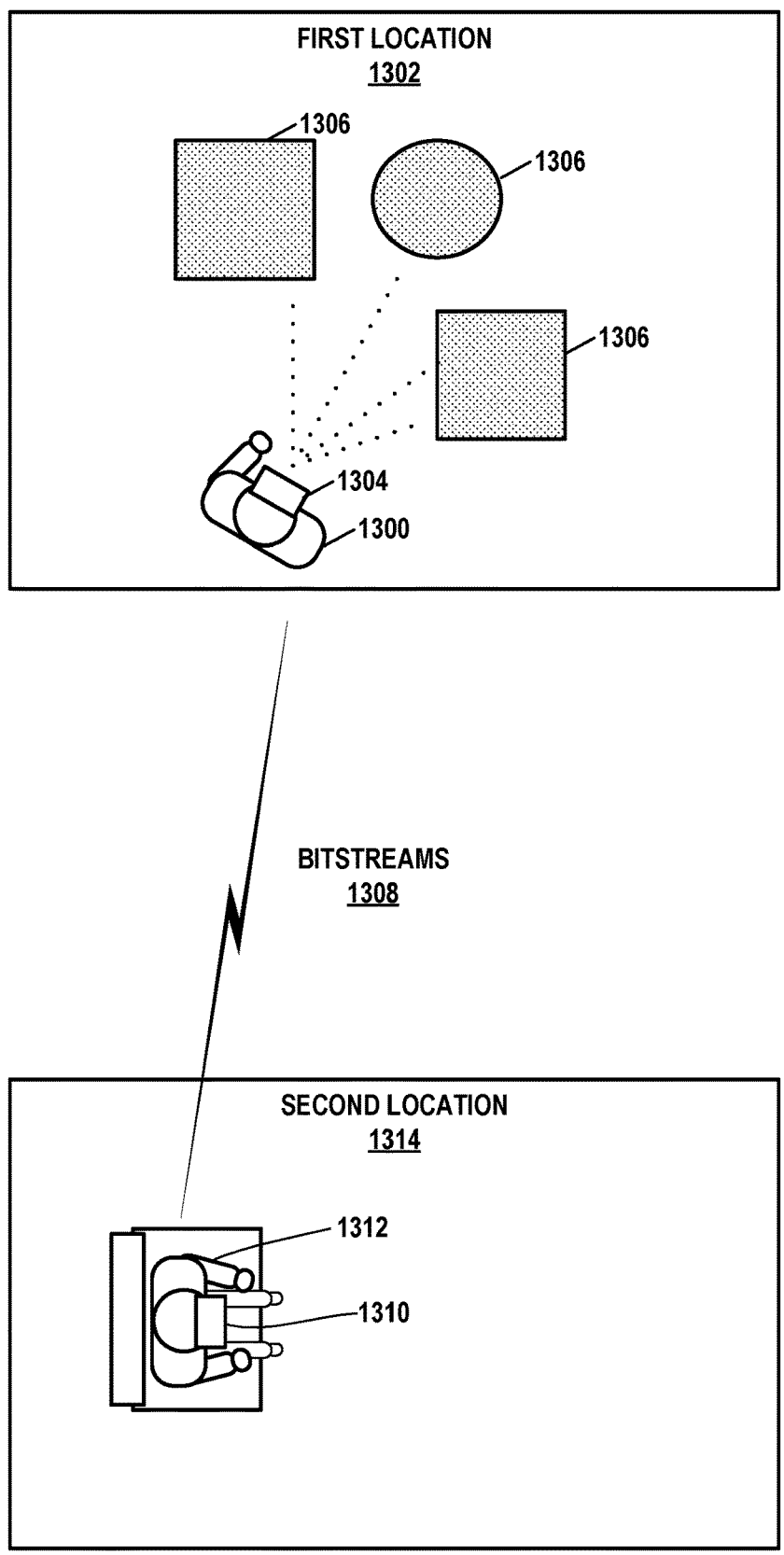
FIG. 13 is a conceptual diagram illustrating an example extended reality system in which one or more techniques of this disclosure may be used.

FIG. 13 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 13, a user 1300 is located in a first location 1302. User 1300 wears an XR headset 1304. As an alternative to XR headset 1304, user 1300 may use a mobile device (e.g., mobile phone, tablet computer, etc.). XR headset 1304 includes a depth detection sensor, such as a range-finding system, that detects positions of points on objects 1306 at location 1302. A data source of XR headset 1304 may use the signals generated by the depth detection sensor to generate a point cloud representation of objects 1306 at location 1302. XR headset 1304 may include a G-PCC encoder (e.g., G-PCC encoder 200 of FIG. 1) that is configured to encode the point cloud to generate bitstreams 1308. In some examples, the G-PCC encoder of XR headset 1304 may use radius interpolation when encoding the point cloud, as described above.

XR headset 1304 may transmit bitstreams 1308 (e.g., via a network such as the Internet) to an XR headset 1310 worn by a user 1312 at a second location 1314. XR headset 1310 may decode bitstreams 1308 to reconstruct the point cloud. In some examples, the G-PCC decoder of XR headset 1310 may use radius interpolation when decoding the point cloud, as described above.

XR headset 1310 may use the point cloud to generate an XR visualization (e.g., an AR, MR, VR visualization) representing objects 1306 at location 1302. Thus, in some examples, such as when XR headset 1310 generates an VR visualization, user 1312 may have a 3D immersive experience of location 1302. In some examples, XR headset 1310 may determine a position of a virtual object based on the reconstructed point cloud. For instance, XR headset 1310 may determine, based on the reconstructed point cloud, that an environment (e.g., location 1302) includes a flat surface and then determine that a virtual object (e.g., a cartoon character) is to be positioned on the flat surface. XR headset 1310 may generate an XR visualization in which the virtual object is at the determined position. For instance, XR headset 1310 may show the cartoon character sitting on the flat surface.

Figure 14:
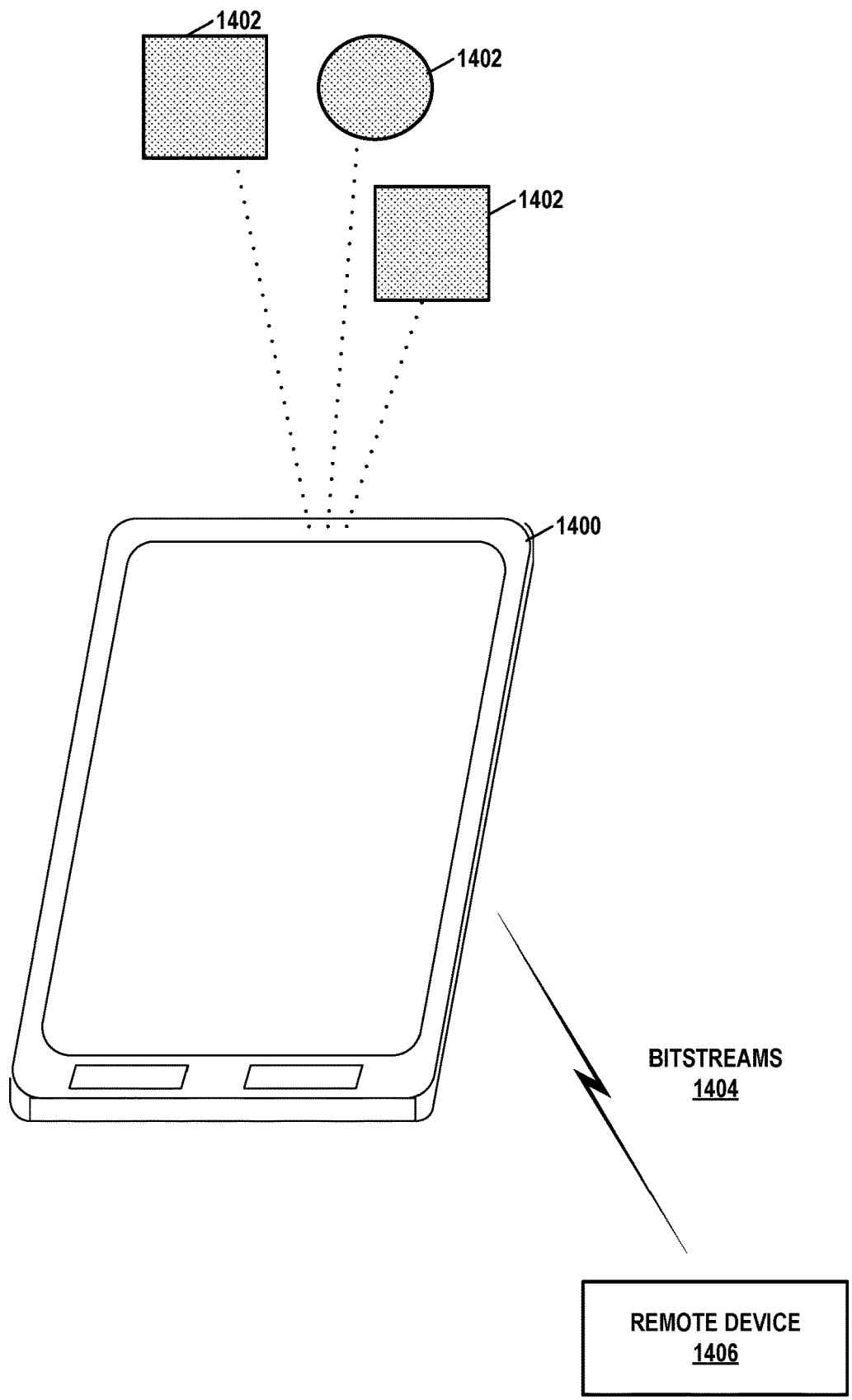
FIG. 14 is a conceptual diagram illustrating an example mobile device system in which one or more techniques of this disclosure may be used.

FIG. 14 is a conceptual diagram illustrating an example mobile device system in which one or more techniques of this disclosure may be used. In the example of FIG. 14, a mobile device 1400, such as a mobile phone or tablet computer, includes a range-finding system, such as a LIDAR system, that detects positions of points on objects 1402 in an environment of mobile device 1400. A data source of mobile device 1400 may use the signals generated by the depth detection sensor to generate a point cloud representation of objects 1402. Mobile device 1400 may include a G-PCC encoder (e.g., G-PCC encoder 200 of FIG. 1) that is configured to encode the point cloud to generate bitstreams 1404.

In the example of FIG. 14, mobile device 1200 may transmit bitstreams to a remote device 1406, such as a server system or other mobile device. Remote device 1406 may decode bitstreams 1404 to reconstruct the point cloud. In some examples, the G-PCC decoder of remote device 1406 may use radius interpolation when decoding the point cloud, as described above.

Remote device 1406 may use the point cloud for various purposes. For example, remote device 1406 may use the point cloud to generate a map of environment of mobile device 1400. For instance, remote device 1406 may generate a map of an interior of a building based on the reconstructed point cloud. In another example, remote device 1406 may generate imagery (e.g., computer graphics) based on the point cloud. For instance, remote device 1406 may use points of the point cloud as vertices of polygons and use color attributes of the points as the basis for shading the polygons. In some examples, remote device 1406 may use the reconstructed point cloud for facial recognition or other security applications.

Examples in the various aspects of this disclosure may be used individually or in any combination.

This disclosure includes the following clauses.

Clause 1A. A method of coding point cloud data, the method comprising: determining at least two reference points in a reference point cloud frame of the point cloud data; applying radius interpolation to the at least two reference points to obtain at least one radius inter predictor for at least one current point in a current point cloud frame of the point cloud data; and coding the current point cloud frame based on the at least one radius inter predictor for the at least one current point in the current point cloud frame.

Clause 2A. The method of clause 1A, wherein the at least two reference points belong to a group of reference points within a range of azimuth angles, laser identifiers (IDs), or radiuses.

Clause 3A. The method of clause 1A or clause 2A, further comprising: compensating the reference point cloud frame for motion.

Clause 4A. The method of clause 3A, wherein compensating the reference point cloud frame for motion comprises applying at least one of rotation, translation, or local motion.

Clause 5A. The method of any of clauses 1A-4A, further comprising: quantizing at least one of position coordinates of the at least two reference points or position coordinates of the at least one current point.

Clause 6A. The method of any of clauses 1A-5A, further comprising: approximating at least one of position coordinates of the at least two reference points or position coordinates of the at least one current point.

Clause 7A. The method of any of clauses 1A-6A, further comprising: scaling at least one of position coordinates of the at least two reference points or position coordinates of the at least one current point.

Clause 8A. The method of any of clauses 5A-7A, further comprising: signaling or parsing a bit depth of the position coordinates.

Clause 9A. The method of clause 5A, further comprising: constructing an array of or a map of the position coordinates of the at least two reference points to further quantize the position coordinates of the at least two reference points.

Clause 10A. The method of any of clauses 1A-8A, wherein the at least two reference points have identical or similar laser identifiers (IDs), the method further comprising: ordering the at least two reference points according to a respective azimuth angle associated with the at least two reference points.

Clause 11A. The method of clause 10A, wherein the at least two reference points have identical azimuth angles, the method further comprising: further ordering the at least two reference points according to a respective radius associated with the at least two reference points.

Clause 12A. The method of any of clauses 1A-8A, wherein the at least two reference points have identical or similar azimuth angles, the method further comprising: ordering the at least two reference points according to a respective laser identifier (ID) associated with the at least two reference points.

Clause 13A. The method of clause 12A, wherein the at least two reference points have identical laser IDs, the method further comprising: further ordering the at least two reference points according to a respective radius associated with the at least two reference points.

Clause 14A. The method of any of clauses 1A-13A, wherein a position of the at least two reference points is associated with a position of the at least one current point.

Clause 15A. The method of any of clauses 1A-14A, further comprising: determining positions of the at least two reference points based on an azimuth angle and laser identifier (ID) of a first current point of the at least one current point.

Clause 16A. The method of clause 15A, wherein determining positions of the at least two reference points comprises: searching for a first nearest azimuth angle that is smaller than an azimuth angle of the first current point to determine a position of a first reference point of the at least two reference points; and searching for a second nearest azimuth angle that is greater than the azimuth angle of the first current point to determine a position of the second reference point of the at least two reference points.

Clause 17A. The method of clause 15A, wherein determining positions of the at least two reference points comprises: searching for a first nearest laser identifier (ID) that is smaller than a laser ID of the first current point to determine a position of a first reference point of the at least two reference points; and searching for a second nearest laser ID that is greater than the laser ID of the first current point to determine a position of the second reference point of the at least two reference points.

Clause 18A. The method of clause 16A or clause 17A, further comprising determining additional reference points of the at least two reference points.

Clause 19A. The method of any of clauses 1A-18A, further comprising determining positions of the at least two reference points based on a range of azimuth angles and laser identifiers (IDs).

Clause 20A. The method of clause 19A, wherein the range of azimuth angles and laser identifiers is based on an interpolation method.

Clause 21A. The method of any of clauses 1A-20A, wherein one or more reference points of the at least two reference points are unavailable or include a duplicate predictor, the method further comprising: replacing an unavailable predictor or a duplicate predictor.

Clause 22A. The method of clause 21A, wherein replacing the unavailable predictor or the duplicate predictor comprises: replacing the unavailable predictor or the duplicate predictor with a default predictor, a reference point with a next nearest laser identifier (ID), or discarding the unavailable predictor or the duplicate predictor.

Clause 23A. The method of any of clauses 1A-22A, wherein the at least two reference points include identical laser identifiers (IDs).

Clause 24A. The method of clause 23A, further comprising: averaging with equal weights a radius associated with a first reference point of the at least two reference points and a radius associated with a second reference point of the at least two reference points.

Clause 25A. The method of clause 23A, further comprising: applying linear interpolation to azimuth angles of the at least two reference points and the current point to obtain a predicted radius of the current point.

Clause 26A. The method of clause 23A, further comprising: applying mathematical trigonometry to determine an interpolated radius.

Clause 27A. The method of clause 23A, wherein the at least two reference points comprise more than two reference points, the method further comprising: applying a radius interpolation filter having more than two coefficients to the more than two reference points.

Clause 28A. The method of any of clauses 23A-26A, further comprising: grouping the two or more reference points into a first segment; grouping two or more current points into a second segment; and generating a plurality of interpolated radius predictors based on the first segment for the second segment.

Clause 29A. The method of any of clauses 23A-27A, further comprising: determining that a difference between a radius value of a first reference point of the two or more reference points and a radius value of a second reference point of the two or more reference points is less than a threshold.

Clause 30A. The method of clause 28A, wherein the threshold is predetermined or the threshold is signaled in a bitstream.

Clause 31A. The method of clause 28A or clause 29A, wherein the threshold is a first threshold, the method further comprising: determining a type of interpolation to apply based on a comparison of the difference between the radius value of a first reference point and the radius value of a second reference point to the first threshold and to a second threshold.

Clause 32A. The method of any of clauses 23A-31A, further comprising: signaling or parsing a syntax element indicative of an applied interpolation method.

Clause 33A. The method of any of clauses 23A-32A, further comprising: signaling or parsing a syntax element indicative of a coefficient or weight of interpolation.

Clause 34A. The method of any of clauses 23A-33A, further comprising: determining a radius residual.

Clause 35A. The method of clause 34A, wherein the radius residual comprises a sign and absolute value.

Clause 36A. The method of clause 34A or 35A, further comprising: context coding the radius residual, wherein contexts for context coding the radius residual are separate from contexts for context coding a radius residual with intra prediction.

Clause 37A. The method of any of clauses 34A-36A, further comprising: prior to determining a predicted radius, decoding an azimuth angle of the current point.

Clause 38A. The method of clause 37A, further comprising: determining an azimuth predictor for the current point; and decoding an azimuth residual.

Clause 39A. The method of clause 38A, wherein an inverse quantization, inverse scaling, or representation bit depth is dependent on a decoded radius value of a previously reconstructed current point.

Clause 40A. The method of clause 38A, wherein an inverse quantization, inverse scaling, or representation bit depth is dependent on a radius value of a reference point of the two or more reference points.

Clause 41A. The method of any of clauses 1A-40A, further comprising: generating the point cloud.

Clause 42A. The method of any of clauses 1A-41A, wherein determining the at least two reference points in the reference point cloud frame comprises determining the at least two reference points in the reference point cloud frame using a previously decoded point.

Clause 43A. The method of any of clauses 1A-41A, wherein determining the at least two reference points in the reference point cloud frame comprises determining the at least two reference points in the reference point cloud frame using a parent node, a grandparent node, or a great-grandparent node, of the at least one current point.

Clause 44A. The method of any of clauses 1A-43A, wherein the at least two reference points comprise two reference points and wherein applying radius interpolation to the at least two reference points comprises averaging of two radius values corresponding to the two reference points.

Clause 45A. The method of clause 44A, wherein the averaging of the two radius values comprises applying a weighted average to the two radius values.

Clause 46A. The method of any of clauses 1A-43A, wherein the at least two reference points comprises more than two reference points and wherein the applying radius interpolation utilizes more than two reference points.

Clause 47A. The method of any of clauses 1A-45A, further comprising: refraining from coding an azimuth angle of the at least one current point first.

Clause 48A. A device for processing a point cloud, the device comprising one or more means for performing the method of any of clauses 1A-47A.

Clause 49A. The device of clause 48, wherein the one or more means comprise one or more processors implemented in circuitry.

Clause 50A. The device of any of clause 48A or clause 49A, further comprising a memory to store the data representing the point cloud.

Clause 51A. The device of any of clauses 48A-50A, wherein the device comprises a decoder.

Clause 52A. The device of any of clauses 48A-51A, wherein the device comprises an encoder.

Clause 53A. The device of any of clauses 48A-50A, further comprising a device to generate the point cloud.

Clause 54A. The device of any of clauses 48A-53A, further comprising a display to present imagery based on the point cloud.

Clause 55A. A computer-readable storage medium having stored thereon instructions that, when executed, cause one or more processors to perform the method of any of clauses 1A-47A.

Clause 1B. A method of coding point cloud data, the method comprising: determining at least two reference points in a reference point cloud frame of the point cloud data; applying radius interpolation to the at least two reference points to obtain at least one radius inter predictor for at least one current point in a current point cloud frame of the point cloud data; and coding the current point cloud frame based on the at least one radius inter predictor for the at least one current point in the current point cloud frame.

Clause 2B. The method of clause 1B, wherein the at least two reference points belong to a group of reference points within a range of at least one of azimuth angles, laser identifiers (IDs), or radiuses.

Clause 3B. The method of clause 1B or clause 2B, further comprising compensating the reference point cloud frame for motion by applying at least one of rotation, translation, or local motion.

Clause 4B. The method of clauses 1B-3B, further comprising at least one of quantizing, approximating, or scaling at least one of position coordinates of the at least two reference points or position coordinates of the at least one current point.

Clause 5B. The method of clause 4B, further comprising signaling or parsing a bit depth of at least one of the position coordinates of the at least two reference points or the position coordinates of the at least one current point.

Clause 6B. The method of clause 4B, further comprising constructing an array of or a map of the position coordinates of the at least two reference points to quantize the position coordinates of the at least two reference points.

Clause 7B. The method of clauses 1B-6B, wherein the at least two reference points have identical or adjacent laser identifiers (IDs), the method further comprising ordering the at least two reference points according to a respective azimuth angle associated with the at least two reference points.

Clause 8B. The method of clause 7B, wherein the at least two reference points have identical azimuth angles, the method further comprising further ordering the at least two reference points according to a respective radius associated with the at least two reference points.

Clause 9B. The method of clauses 1B-6B, wherein the at least two reference points have identical or adjacent azimuth angles, the method further comprising ordering the at least two reference points according to a respective laser identifier associated with the at least two reference points.

Clause 10B. The method of clause 9B, wherein the at least two reference points have identical laser identifiers, the method further comprising further ordering the at least two reference points according to a respective radius associated with the at least two reference points.

Clause 11B. The method of any of clauses 1B-10B, wherein a position of the at least two reference points is associated with a position of the at least one current point.

Clause 12B. The method of any of clauses 1B-11B, further comprising determining positions of the at least two reference points based on an azimuth angle and laser identifier of a first current point of the at least one current point.

Clause 13B. The method of clause 12B, wherein determining positions of the at least two reference points comprises: searching for a first nearest azimuth angle that is smaller than an azimuth angle of the first current point to determine a position of a first reference point of the at least two reference points; and searching for a second nearest azimuth angle that is greater than the azimuth angle of the first current point to determine a position of the second reference point of the at least two reference points.

Clause 14B. The method of clause 12B, wherein determining positions of the at least two reference points comprises: searching for a first nearest laser identifier (ID) that is smaller than a laser ID of the first current point to determine a position of a first reference point of the at least two reference points; and searching for a second nearest laser ID that is greater than the laser ID of the first current point to determine a position of the second reference point of the at least two reference points.

Clause 15B. The method of any of clauses 1B-11B, further comprising determining positions of the at least two reference points based on a range of azimuth angles and laser identifiers.

Clause 16B. The method of clause 15B, wherein the range of azimuth angles and laser identifiers is based on a radius interpolation method to be applied to the at least two reference points.

Clause 17B. The method of any of clauses 1B-16B, wherein one or more reference points of the at least two reference points are unavailable or include a duplicate predictor, the method further comprising: replacing an unavailable predictor or a duplicate predictor with a default predictor or a reference point with a next nearest laser identifier or azimuth angle; or discarding the unavailable predictor or the duplicate predictor.

Clause 18B. The method of any of clauses 1B-17B, wherein the at least two reference points include identical laser identifiers or identical azimuth angles.

Clause 19B. The method of clause 18B, wherein applying radius interpolation to the at least two reference points comprises: averaging with equal weights radius values of the at least two reference points; applying linear interpolation to the radius values of the at least two reference points using azimuth angles or laser identifiers of the at least two reference points and the current point to obtain a predicted radius of the current point; or applying mathematical trigonometry to the radius values of the at least two reference points.

Clause 20B. The method of clause 18B, wherein the at least two reference points comprise more than two reference points, and wherein applying radius interpolation to the at least two reference points comprises applying a radius interpolation filter having more than two coefficients to the more than two reference points.

Clause 21B. The method of clause 18B, wherein the current point is one point of at least two current points, the method further comprising: grouping the at least two reference points into a first segment; grouping the at least two current points into a second segment; and generating a plurality of interpolated radius predictors based on the first segment for the second segment.

Clause 22B. The method of clause 18B, wherein the at least two reference points comprise two reference points and wherein applying radius interpolation to the at least two reference points comprises averaging two radius values corresponding to the two reference points.

Clause 23B. The method of clause 22B, wherein the averaging of the two radius values comprises applying a weighted average to the two radius values.

Clause 24B. The method of any of clauses 18B-23B, further comprising, prior to applying radius interpolation to the at least two reference points, determining that a difference between a radius value of a first reference point of the at least two reference points and a radius value of a second reference point of the at least two reference points is less than a threshold.

Clause 25B. The method of clause 24B, wherein the threshold is a first threshold, the method further comprising determining a type of interpolation to apply based on a comparison of the difference between the radius value of a first reference point and the radius value of a second reference point to the first threshold and to a second threshold.

Clause 26B. The method of any of clauses 18B-25B, further comprising at least one of a) signaling or parsing a syntax element indicative of an applied interpolation method or b) signaling or parsing a syntax element indicative of a coefficient or weight of interpolation.

Clause 27B. The method of any of clauses 1B-26B, further comprising determining a radius residual.

Clause 28B. The method of clause 27B, further comprising context coding the radius residual, wherein contexts for context coding the radius residual are separate from contexts for context coding a radius residual with intra prediction.

Clause 29B. The method of clause 27B or clause 28B, further comprising prior to determining a predicted radius, decoding an azimuth residual of the current point.

Clause 30B. The method of clause 29B, wherein an inverse quantization, inverse scaling, or representation bit depth is dependent on a decoded radius value of a previously reconstructed point or a radius value of a reference point of the two or more reference points.

Clause 31B. The method of any of clauses 1B-30B, wherein determining the at least two reference points in the reference point cloud frame comprises determining the at least two reference points in the reference point cloud frame using a previously decoded point.

Clause 32B. The method of any of clauses 1B-30B, wherein determining the at least two reference points in the reference point cloud frame comprises determining the at least two reference points in the reference point cloud frame using a parent node, a grandparent node, or a great-grandparent node, of the at least one current point.

Clause 33B. A device for coding point cloud data, the device comprising: memory configured to store the point cloud data; and one or more processors communicatively coupled to the memory, the one or more processors being configured to: determine at least two reference points in a reference point cloud frame of the point cloud data; apply radius interpolation to the at least two reference points to obtain at least one radius inter predictor for at least one current point in a current point cloud frame of the point cloud data; and code the current point cloud frame based on the at least one radius inter predictor for the at least one current point in the current point cloud frame.

Clause 34B. The device of clause 33B, wherein the at least two reference points belong to a group of reference points within a range of at least one of azimuth angles, laser identifiers (IDs), or radiuses.

Clause 35B. The device of clause 33B or clause 34B, wherein the one or more processors are further configured to compensate the reference point cloud frame for motion by applying at least one of rotation, translation, or local motion.

Clause 36B. The device of clauses 33B-35B, wherein the one or more processors are further configured to at least one of quantize, approximate, or scale at least one of position coordinates of the at least two reference points or position coordinates of the at least one current point.

Clause 37B. The device of clause 36B, wherein the one or more processors are further configured to signal or parse a bit depth of at least one of the position coordinates of the at least two reference points or the position coordinates of the at least one current point.

Clause 38B. The device of clause 36B, wherein the one or more processors are further configured to construct an array of or a map of the position coordinates of the at least two reference points to quantize the position coordinates of the at least two reference points.

Clause 39B. The device of clauses 33B-38B, wherein the at least two reference points have identical or adjacent laser identifiers (IDs), wherein the one or more processors are further configured to order the at least two reference points according to a respective azimuth angle associated with the at least two reference points.

Clause 40B. The device of clause 39B, wherein the at least two reference points have identical azimuth angles, wherein the one or more processors are further configured to further order the at least two reference points according to a respective radius associated with the at least two reference points.

Clause 41B. The device of clauses 33B-38B, wherein the at least two reference points have identical or adjacent azimuth angles, wherein the one or more processors are further configured to order the at least two reference points according to a respective laser identifier associated with the at least two reference points.

Clause 42B. The device of clause 41B, wherein the at least two reference points have identical laser identifiers, wherein the one or more processors are further configured to further order the at least two reference points according to a respective radius associated with the at least two reference points.

Clause 43B. The device of any of clauses 33B-42B, wherein a position of the at least two reference points is associated with a position of the at least one current point.

Clause 44B. The device of any of clauses 33B-43B, wherein the one or more processors are further configured to determine positions of the at least two reference points based on an azimuth angle and laser identifier of a first current point of the at least one current point.

Clause 45B. The device of clause 44B, wherein as part of determining positions of the at least two reference points, the one or more processors are configured to: search for a first nearest azimuth angle that is smaller than an azimuth angle of the first current point to determine a position of a first reference point of the at least two reference points; and search for a second nearest azimuth angle that is greater than the azimuth angle of the first current point to determine a position of the second reference point of the at least two reference points.

Clause 46B. The device of clause 44B, wherein as part of determining positions of the at least two reference points, the one or more processors are configured to: search for a first nearest laser identifier (ID) that is smaller than a laser ID of the first current point to determine a position of a first reference point of the at least two reference points; and search for a second nearest laser ID that is greater than the laser ID of the first current point to determine a position of the second reference point of the at least two reference points.

Clause 47B. The device of any of clauses 33B-43B, wherein the one or more processors are further configured to determine positions of the at least two reference points based on a range of azimuth angles and laser identifiers.

Clause 48B. The device of clause 47B, wherein the range of azimuth angles and laser identifiers is based on radius interpolation method to be applied to the at least two reference points.

Clause 49B. The device of any of clauses 33B-48B, wherein one or more reference points of the at least two reference points are unavailable or include a duplicate predictor, wherein the one or more processors are further configured to: replace an unavailable predictor or a duplicate predictor with a default predictor or a reference point with a next nearest laser identifier or azimuth angle; or discard the unavailable predictor or the duplicate predictor.

Clause 50B. The device of any of clauses 33B-49B, wherein the at least two reference points include identical laser identifiers or identical azimuth angles.

Clause 51B. The device of clause 50B, wherein as part of applying radius interpolation to the at least two reference points, the one or more processors are configured to: average with equal weights radius values of the at least two reference points; apply linear interpolation to the radius values of the at least two reference points using azimuth angles or laser identifiers of the at least two reference points and the current point to obtain a predicted radius of the current point; or apply mathematical trigonometry to the radius values of the at least two reference points.

Clause 52B. The device of clause 50B, wherein the at least two reference points comprise more than two reference points, and wherein as part of applying radius interpolation to the at least two reference points, the one or more processors are configured to apply a radius interpolation filter having more than two coefficients to the more than two reference points.

Clause 53B. The device of clause 50B, wherein the current point is one point of at least two current points, wherein the one or more processors are further configured to: group the at least two reference points into a first segment; group the at least two current points into a second segment; and generate a plurality of interpolated radius predictors based on the first segment for the second segment.

Clause 54B. The device of any of clauses 50B, wherein the at least two reference points comprise two reference points and wherein as part of applying radius interpolation to the at least two reference points, the one or more processors are configured to average two radius values corresponding to the two reference points.

Clause 55B. The device of clause 54B, wherein the averaging of the two radius values comprises applying a weighted average to the two radius values.

Clause 56B. The device of any of clauses 51B-55B, wherein the one or more processors are further configured to, prior to applying radius interpolation to the at least two reference points, determine that a difference between a radius value of a first reference point of the at least two reference points and a radius value of a second reference point of the at least two reference points is less than a threshold.

Clause 57B. The device of clause 56B, wherein the threshold is a first threshold, wherein the one or more processors are further configured to determine a type of interpolation to apply based on a comparison of the difference between the radius value of a first reference point and the radius value of a second reference point to the first threshold and to a second threshold.

Clause 58B. The device of any of clauses 50B-57B, wherein the one or more processors are further configured to at least one of a) signal or parse a syntax element indicative of an applied interpolation method or b) signal or parse a syntax element indicative of a coefficient or weight of interpolation.

Clause 59B. The device of any of clauses 50B-58B, wherein the one or more processors are further configured to determine a radius residual.

Clause 60B. The device of clause 59B, wherein the one or more processors are further configured to context code the radius residual, wherein contexts for context coding the radius residual are separate from contexts for context coding a radius residual with intra prediction.

Clause 61B. The device of clause 59B or clause 60B, wherein the one or more processors are further configured to, prior to determining a predicted radius, decode an azimuth residual of the current point.

Clause 62B. The device of clause 61B, wherein an inverse quantization, inverse scaling, or representation bit depth is dependent on a decoded radius value of a previously reconstructed point or a radius value of a reference point of the two or more reference points.

Clause 63B. The device of any of clauses 33B-62B, wherein as part of determining the at least two reference points in the reference point cloud frame, the one or more processors are configured to determine the at least two reference points in the reference point cloud frame using a previously decoded point.

Clause 64B. The device of any of clauses 33B-62B, wherein as part of determining the at least two reference points in the reference point cloud frame, wherein the one or more processors are further configured to determine the at least two reference points in the reference point cloud frame using a parent node, a grandparent node, or a great-grandparent node, of the at least one current point.

Clause 65B. The device of any of clauses 33B-64B, wherein the device comprises a vehicle, a robot, an extended reality system, or a smartphone.

Clause 66B. A non-transitory computer-readable storage medium storing instructions, which, when executed, cause one or more processors to: determine at least two reference points in a reference point cloud frame of the point cloud data; apply radius interpolation to the at least two reference points to obtain at least one radius inter predictor for at least one current point in a current point cloud frame of the point cloud data; and code the current point cloud frame based on the at least one radius inter predictor for the at least one current point in the current point cloud frame.

Clause 67B. A device for coding point cloud data, the device comprising: means for determining at least two reference points in a reference point cloud frame of the point cloud data; means for applying radius interpolation to the at least two reference points to obtain at least one radius inter predictor for at least one current point in a current point cloud frame of the point cloud data; and means for coding the current point cloud frame based on the at least one radius inter predictor for the at least one current point in the current point cloud frame.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding point cloud data, the method comprising:
   determining at least two reference points in a reference point cloud frame of the point cloud data;
   applying linear interpolation to the at least two reference points to derive a third reference point different than the at least two reference points, the third reference point comprising a radius inter predictor, the radius inter predictor indicative of a radius of at least one current point in a current point cloud frame of the point cloud data; and
   coding the current point cloud frame based on the radius inter predictor for the at least one current point in the current point cloud frame.

2. The method of claim 1, wherein the at least two reference points belong to a group of reference points within a range of at least one of azimuth angles, laser identifiers (IDs), or radiuses.

3. The method of claim 1, further comprising compensating the reference point cloud frame for motion by applying at least one of rotation, translation, or local motion.

4. The method of claim 1, further comprising at least one of quantizing, approximating, or scaling at least one of position coordinates of the at least two reference points or position coordinates of the at least one current point.

5. The method of claim 4, further comprising signaling or parsing a bit depth of at least one of the position coordinates of the at least two reference points or the position coordinates of the at least one current point.

6. The method of claim 4, further comprising constructing an array of or a map of the position coordinates of the at least two reference points to quantize the position coordinates of the at least two reference points.

7. The method of claim 1, wherein the at least two reference points have identical or adjacent laser identifiers (IDs), the method further comprising ordering the at least two reference points according to a respective azimuth angle associated with the at least two reference points.

8. The method of claim 7, wherein the at least two reference points have identical azimuth angles, the method further comprising further ordering the at least two reference points according to a respective radius associated with the at least two reference points.

9. The method of claim 1, wherein the at least two reference points have identical or adjacent azimuth angles, the method further comprising ordering the at least two reference points according to a respective laser identifier associated with the at least two reference points.

10. The method of claim 9, wherein the at least two reference points have identical laser identifiers, the method further comprising further ordering the at least two reference points according to a respective radius associated with the at least two reference points.

11. The method of claim 1, wherein a position of the at least two reference points is associated with a position of the at least one current point.

12. The method of claim 1, further comprising determining positions of the at least two reference points based on an azimuth angle and laser identifier of a first current point of the at least one current point.

13. The method of claim 12, wherein determining positions of the at least two reference points comprises:
   searching for a first nearest azimuth angle that is smaller than an azimuth angle of the first current point to determine a position of a first reference point of the at least two reference points; and
   searching for a second nearest azimuth angle that is greater than the azimuth angle of the first current point to determine a position of a second reference point of the at least two reference points.

14. The method of claim 12, wherein determining positions of the at least two reference points comprises:
- searching for a first nearest laser identifier (ID) that is smaller than a laser ID of the first current point to determine a position of a first reference point of the at least two reference points; and
- searching for a second nearest laser ID that is greater than the laser ID of the first current point to determine a position of a second reference point of the at least two reference points.

15. The method of claim 1, further comprising determining positions of the at least two reference points based on a range of azimuth angles and laser identifiers (IDs).

16. The method of claim 15, wherein the range of azimuth angles and laser identifiers is based on a radius interpolation method to be applied to the at least two reference points.

17. The method of claim 1, wherein one or more reference points of the at least two reference points are unavailable or include a duplicate predictor, the method further comprising:
- replacing an unavailable predictor or a duplicate predictor with a default predictor or a reference point with a next nearest laser identifier or azimuth angle; or
- discarding the unavailable predictor or the duplicate predictor.

18. The method of claim 1, wherein the at least two reference points include identical laser identifiers or identical azimuth angles.

19. The method of claim 18, wherein the at least two reference points comprise more than two reference points, and wherein applying linear interpolation to the at least two reference points comprises applying a radius interpolation filter having more than two coefficients to the more than two reference points.

20. The method of claim 18, wherein the current point is one point of at least two current points, the method further comprising:
- grouping the at least two reference points into a first segment;
- grouping the at least two current points into a second segment; and
- generating a plurality of interpolated radius predictors based on the first segment for the second segment.

21. The method of claim 18, further comprising, prior to applying linear interpolation to the at least two reference points, determining that a difference between a radius value of a first reference point of the at least two reference points and a radius value of a second reference point of the at least two reference points is less than a threshold.

22. The method of claim 21, wherein the threshold is a first threshold, the method further comprising determining a type of interpolation to apply based on a comparison of the difference between the radius value of a first reference point and the radius value of a second reference point to the first threshold and to a second threshold.

23. The method of claim 18, further comprising at least one of a) signaling or parsing a syntax element indicative of an applied interpolation method or b) signaling or parsing a syntax element indicative of a coefficient or weight of interpolation.

24. The method of claim 1, further comprising determining a radius residual.

25. The method of claim 24, further comprising context coding the radius residual, wherein contexts for context coding the radius residual are separate from contexts for context coding a radius residual with intra prediction.

26. The method of claim 24, further comprising prior to determining a predicted radius, decoding an azimuth residual of the current point.

27. The method of claim 26, wherein an inverse quantization, inverse scaling, or representation bit depth is dependent on a decoded radius value of a previously reconstructed point or a radius value of a reference point of two or more reference points.

28. The method of claim 1, wherein determining the at least two reference points in the reference point cloud frame comprises determining the at least two reference points in the reference point cloud frame using a previously decoded point.

29. The method of claim 1, wherein determining the at least two reference points in the reference point cloud frame comprises determining the at least two reference points in the reference point cloud frame using a parent node, a grandparent node, or a great-grandparent node, of the at least one current point.

30. A device for coding point cloud data, the device comprising:
- memory configured to store the point cloud data; and
- one or more processors communicatively coupled to the memory, the one or more processors being configured to:
  - determine at least two reference points in a reference point cloud frame of the point cloud data;
  - apply linear interpolation to the at least two reference points to derive a third reference point different than the at least two reference points, the third reference point comprising a radius inter predictor, the radius inter predictor indicative of a radius of at least one current point in a current point cloud frame of the point cloud data; and
  - code the current point cloud frame based on the radius inter predictor for the at least one current point in the current point cloud frame.

31. The device of claim 30, wherein the device comprises a vehicle, a robot, an extended reality system, or a smartphone.

32. The device of claim 30, wherein the at least two reference points belong to a group of reference points within a range of at least one of azimuth angles, laser identifiers (IDs), or radiuses.

33. The device of claim 30, wherein the one or more processors are further configured to at least one of quantize, approximate, or scale at least one of position coordinates of the at least two reference points or position coordinates of the at least one current point.

34. The device of claim 30, wherein the at least two reference points have identical or adjacent laser identifiers (IDs), wherein the one or more processors are further configured to order the at least two reference points according to a respective azimuth angle associated with the at least two reference points.

35. The device of claim 30, wherein the at least two reference points have identical or adjacent azimuth angles, wherein the one or more processors are further configured to order the at least two reference points according to a respective laser identifier associated with the at least two reference points.

36. The device of claim 30, wherein the one or more processors are further configured to determine positions of the at least two reference points based on an azimuth angle and laser identifier of a first current point of the at least one current point.

37. The device of claim 30, wherein the one or more processors are further configured to determine positions of the at least two reference points based on a range of azimuth angles and laser identifiers.

38. The device of claim 30, wherein the one or more processors are further configured to compensate the reference point cloud frame for motion by applying at least one of rotation, translation, or local motion.

39. The device of claim 30, wherein the at least two reference points include identical laser identifiers or identical azimuth angles.

40. The device of claim 36, wherein to determine positions of the at least two reference points the one or more processors are further configured to:
    search for a first nearest azimuth angle that is smaller than an azimuth angle of the first current point to determine a position of a first reference point of the at least two reference points; and
    search for a second nearest azimuth angle that is greater than the azimuth angle of the first current point to determine a position of a second reference point of the at least two reference points.

41. A non-transitory computer-readable storage medium storing instructions, which, when executed, cause one or more processors to:
    determine at least two reference points in a reference point cloud frame of point cloud data;
    apply linear interpolation to the at least two reference points to derive a third reference point different than the at least two reference points, the third reference point comprising a radius inter predictor, the radius inter predictor indicative of a radius of at least one current point in a current point cloud frame of the point cloud data; and
    code the current point cloud frame based on the radius inter predictor for the at least one current point in the current point cloud frame.

\* \* \* \* \*